(12) United States Patent
Toshimitsu et al.

(10) Patent No.: US 12,512,980 B2
(45) Date of Patent: Dec. 30, 2025

(54) IC CARD, PORTABLE ELECTRONIC DEVICE, AND ISSUING DEVICE

(71) Applicant: KABUSHIKI KAISHA TOSHIBA, Tokyo (JP)

(72) Inventors: Kiyoshi Toshimitsu, Tokyo (JP); Masakazu Kato, Tokyo (JP); Aki Fukuda, Yokohama Kanagawa (JP); Ryouichi Kuriyama, Yokosuka Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 232 days.

(21) Appl. No.: 18/306,380

(22) Filed: Apr. 25, 2023

(65) Prior Publication Data

US 2023/0261864 A1 Aug. 17, 2023

Related U.S. Application Data

(63) Continuation of application No. PCT/JP2021/038729, filed on Oct. 20, 2021.

(30) Foreign Application Priority Data

Nov. 2, 2020 (JP) .................................. 2020-183787

(51) Int. Cl.
*H04L 29/06* (2006.01)
*G06K 19/073* (2006.01)
(Continued)

(52) U.S. Cl.
CPC ........ *H04L 9/088* (2013.01); *G06K 19/07309* (2013.01); *H04L 9/30* (2013.01)

(58) Field of Classification Search
CPC ... H04L 9/088; H04L 9/30; H04L 9/14; H04L 63/0823; H04L 63/0853; H04L 63/0861;
(Continued)

(56) References Cited

U.S. PATENT DOCUMENTS

2004/0006695 A1   1/2004   Ishibashi et al.
2005/0055557 A1*  3/2005   Yamada .................. G06F 21/32
                                                       713/186
(Continued)

FOREIGN PATENT DOCUMENTS

EP   2278534 A1 *  1/2011   ........... G06F 21/606
EP   3379457 A2 *  9/2018   ............. G06F 21/32
(Continued)

OTHER PUBLICATIONS

Wikipedia, "ISO/IEC 7816," 8 pages, https://en.wikipedia.org/w/index.php?title=1S0/IEC_7816&oldid=972159580 (2020).
(Continued)

*Primary Examiner* — Ka Shan Choy
(74) *Attorney, Agent, or Firm* — Finnegan, Henderson, Farabow, Garrett & Dunner, LLP

(57) ABSTRACT

According to an embodiment, an IC card associated with a parent IC card includes a sensor, a first storage unit, a second storage unit, a communication unit, and a processor. A sensor is configured to acquire biological information. The first storage unit is configured to store a template with which the biological information is verified. The second storage unit is configured to store second data related to first data stored in the parent IC card. The communication unit is configured to transmit and receive data to and from a host device. The processor is configured to authenticate a user based on a verification result of the biological information and the template in accordance with a command from the host device, and transmit at least some of the second data to the host device if the authentication of the user is successful.

12 Claims, 15 Drawing Sheets

(51) Int. Cl.
*H04L 9/08* (2006.01)
*H04L 9/30* (2006.01)

(58) Field of Classification Search
CPC ............... H04L 9/3231; H04L 9/3263; G06K 19/07309; G06K 19/0718; G06F 21/32; G06F 21/34
See application file for complete search history.

(56) References Cited

U.S. PATENT DOCUMENTS

| | | |
|---|---|---|
| 2006/0151599 A1 | 7/2006 | Awatsu et al. |
| 2010/0051688 A1 | 3/2010 | Imaizumi et al. |
| 2011/0113241 A1 | 5/2011 | Umezawa et al. |
| 2017/0337417 A1 | 11/2017 | Lowe et al. |
| 2019/0095771 A1* | 3/2019 | Okuno ................ B42D 25/305 |
| 2019/0180018 A1* | 6/2019 | Miura ....................... G06T 7/00 |
| 2022/0045852 A1* | 2/2022 | Isshiki .................. H04L 9/3271 |
| 2022/0052841 A1* | 2/2022 | Fukuda ................ H04L 9/3231 |
| 2022/0078906 A1* | 3/2022 | Kim ................... G06K 19/0718 |

FOREIGN PATENT DOCUMENTS

| | | |
|---|---|---|
| JP | 2002-366438 A | 12/2002 |
| JP | 2003-016397 A | 1/2003 |
| JP | 2004-110365 A | 4/2004 |
| JP | 2004-287805 A | 10/2004 |
| JP | 2006-195591 A | 7/2006 |
| JP | 2009-277184 A | 11/2009 |
| JP | 2010-055228 A | 3/2010 |
| JP | 2010-282307 A | 12/2010 |
| JP | 2011-232837 A | 11/2011 |
| JP | 2012-049752 A | 3/2012 |
| JP | 2012-113467 A | 6/2012 |
| JP | 2017-532683 A | 11/2017 |
| WO | WO-2020004495 A1 * | 1/2020 ......... H04L 63/0823 |

OTHER PUBLICATIONS

European Patent Office, Extended European Search Report in EP App. No. 21886021.1, 11 pages (Aug. 26, 2024).
International Search Report (PCT/JP2021/038729 filed Oct. 20, 2021).

* cited by examiner

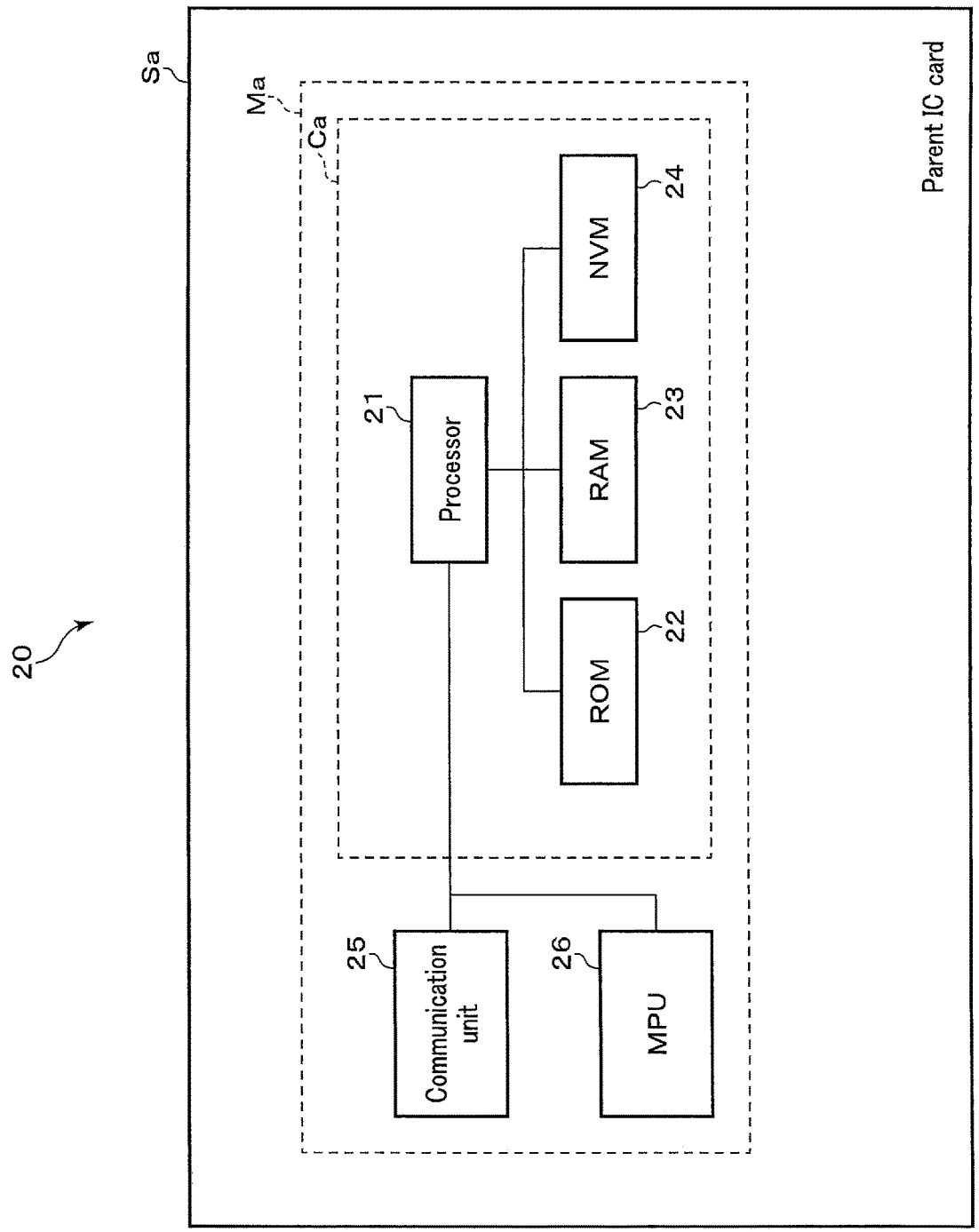
F I G. 3

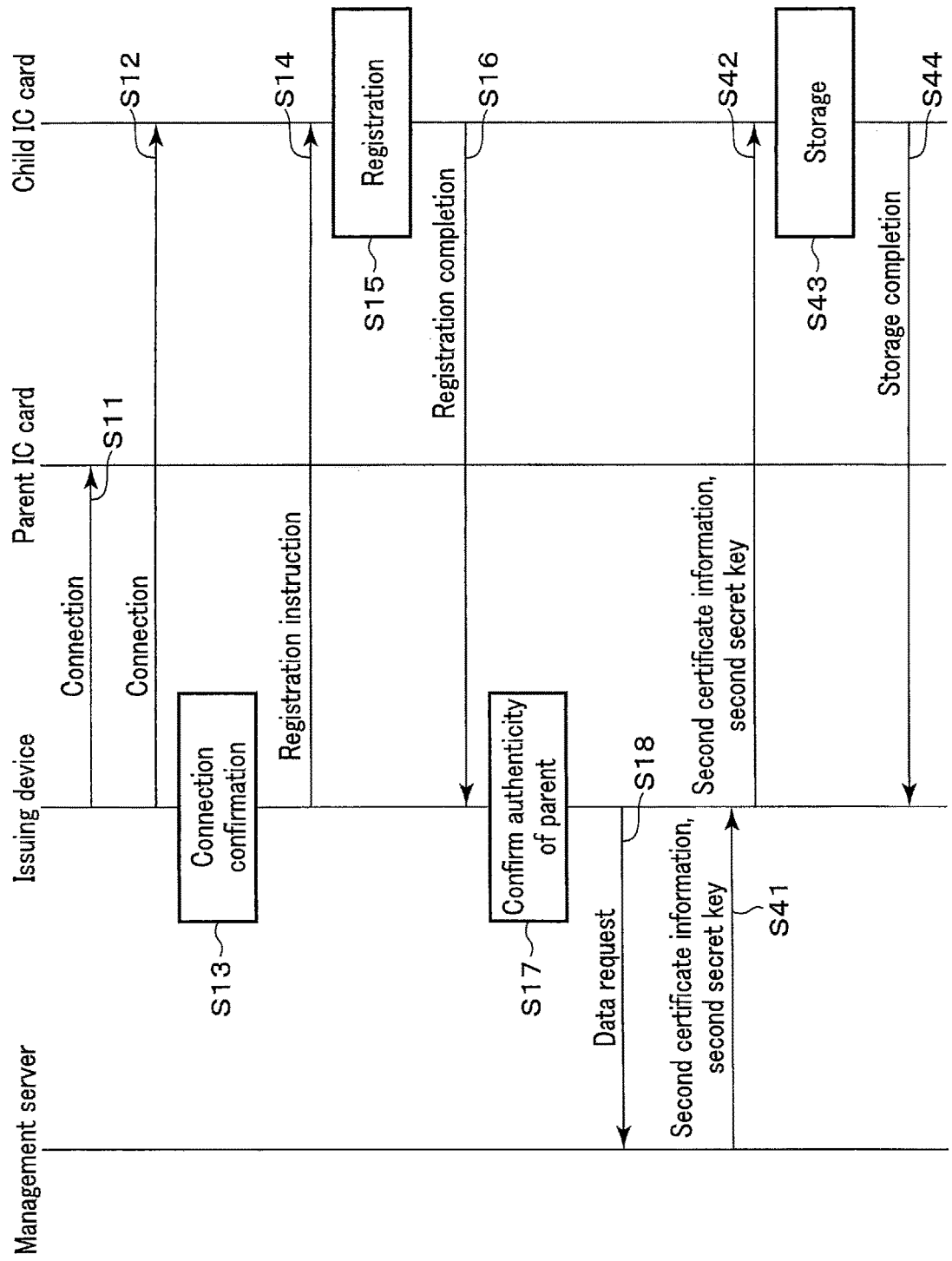
F I G. 9

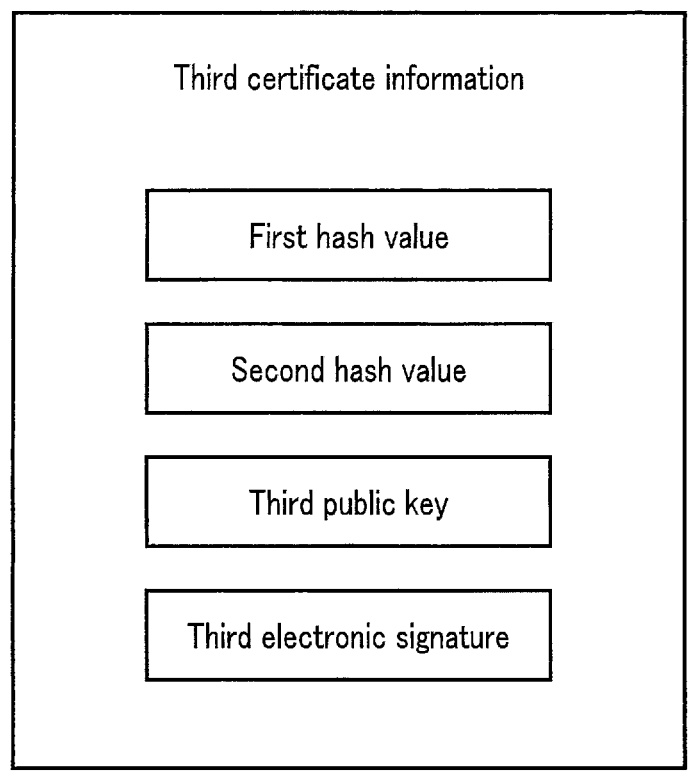
F I G. 10

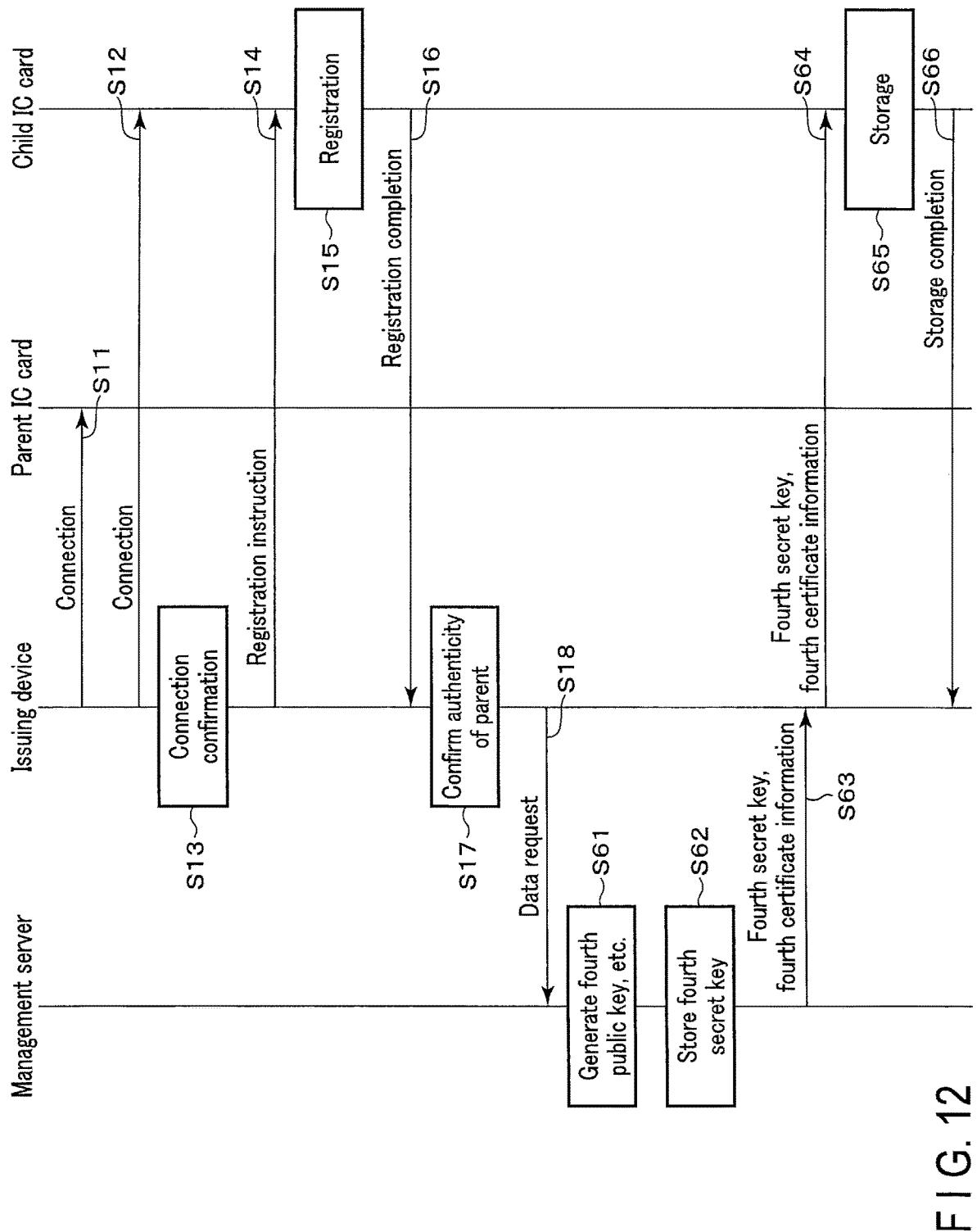
F I G. 12

IC CARD, PORTABLE ELECTRONIC DEVICE, AND ISSUING DEVICE

CROSS REFERENCE TO RELATED APPLICATIONS

This application is a Continuation Application of PCT Application No. PCT/JP2021/038729, filed Oct. 20, 2021 and based upon and claiming the benefit of priority from Japanese Patent Application No. 2020-183787, filed Nov. 2, 2020, the entire contents of all of which are incorporated herein by reference.

FIELD

Embodiments described herein relate generally to an IC card, a portable electronic device, and an issuing device.

BACKGROUND

A method of issuing a child IC card associated with a parent IC card storing a template of biological information has been provided. The child IC card realizes a function or a part of a function of the parent IC card.

Conventionally, an issuing device for issuing a child IC card requires a mechanism for acquiring biological information from a parent IC card, such as a mechanism for authenticating a person using biological information stored in the parent IC card.

BRIEF DESCRIPTION OF THE DRAWINGS

FIG. 3 is a block diagram showing a configuration example of a parent IC card according to the first embodiment.

FIG. 9 is a sequence diagram showing an operation example of an issuing system according to a third embodiment.

FIG. 10 is a diagram showing a configuration example of third certificate information according to the third embodiment.

FIG. 12 is a sequence diagram showing an operation example of an issuing system according to a fifth embodiment.

DETAILED DESCRIPTION

According to an embodiment, an IC card associated with a parent IC card includes a sensor, a first storage unit, a second storage unit, a communication unit, and a processor. A sensor is configured to acquire biological information. The first storage unit is configured to store a template with which the biological information is verified. The second storage unit is configured to store second data related to first data stored in the parent IC card. The communication unit is configured to transmit and receive data to and from a host device. The processor is configured to authenticate a user based on a verification result of the biological information and the template in accordance with a command from the host device, and transmit at least some of the second data to the host device if the authentication of the user is successful.

Hereinafter, embodiments will be described with reference to the drawings.

First Embodiment

First, a first embodiment will be described.

An issuing system according to the embodiment issues a child IC card by using an IC card such as a My Number card as a parent IC card. The issuing system stores information related to information stored in the parent IC card in the child IC card. Further, the issuing system issues a child IC card capable of performing biometric authentication.

Figure 1:
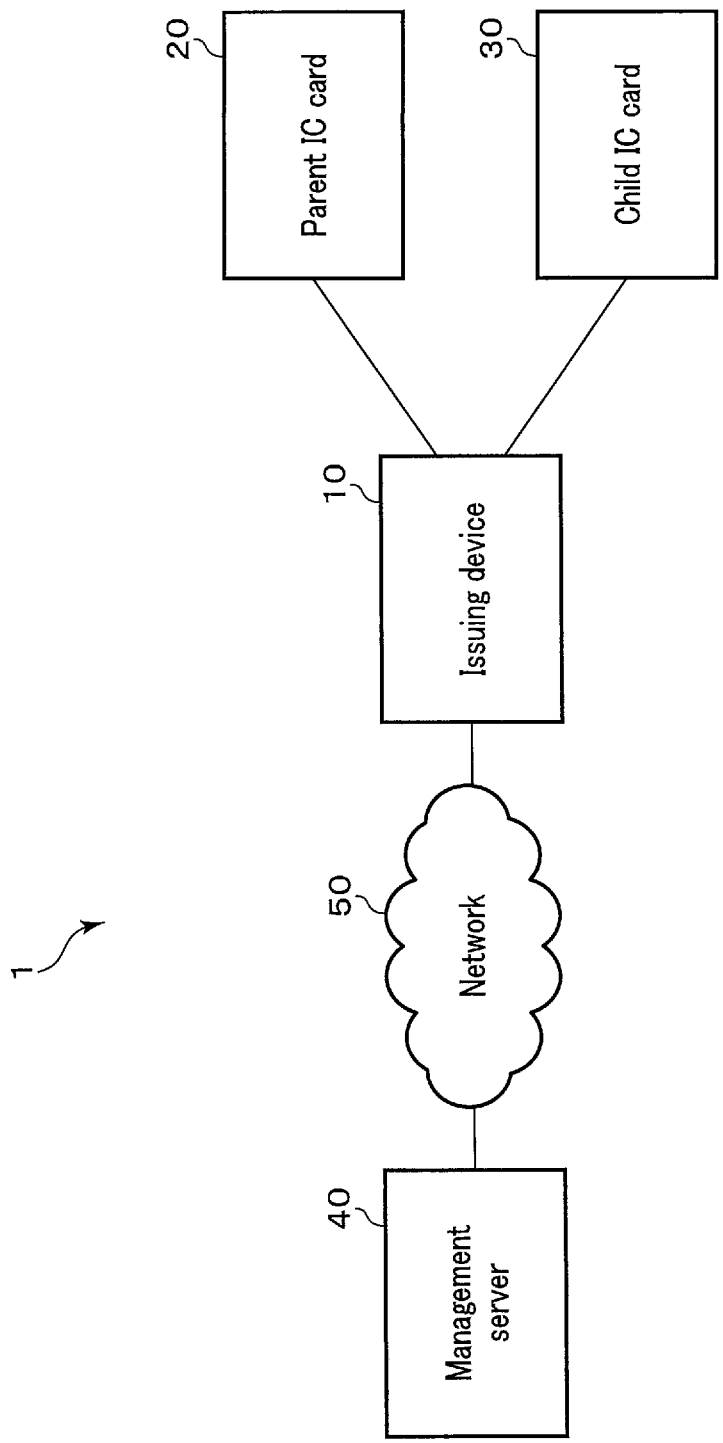
FIG. 1 is a block diagram showing a configuration example of an issuing system according to a first embodiment.

FIG. 1 shows a configuration example of an issuing system 1 according to the embodiment. As shown in FIG. 1, the issuing system 1 includes an issuing device 10, a parent IC card 20, a child IC card 30, a management server 40, etc. The issuing device 10 is connected to the parent IC card 20 and the child IC card 30. The issuing device 10 is connected to the management server 40 via the network 50.

In addition to the configuration shown in FIG. 1, the issuing system 1 may further include other configurations as necessary, or a specific configuration may be excluded from the issuing system 1.

The issuing device 10 (host device) issues a child IC card associated with a parent IC card. The issuing device 10 issues the child IC card 30 in a state connected to the parent IC card 20. The issuing device 10 acquires data to be stored in the child IC card 30 from the management server 40, the parent IC card 20, or the like. The issuing device 10 stores the acquired data in the child IC card 30. The issuing device 10 will be described in detail later.

The parent IC card 20 is an IC card for performing a predetermined authentication process. The parent IC card 20 stores biological information such as a facial image. The parent IC card 20 authenticates a user by using a password or the biological information. The parent IC card 20 outputs the biological information to an external device. The external device may capture a face image of the user by using a camera or the like, and verify the face image with the biological information from the parent IC card 20. Further, the external device may display the biological information from the parent IC card 20 and accept authentication by an operator.

The parent IC card 20 stores certificate information composed of a secret key, a public key, etc. The parent IC card 20 may store a plurality of secret keys and a plurality of pieces of certificate information. The parent IC card 20 will be described in detail later.

The child IC card 30 is an IC card associated with the parent IC card 20. The child IC card 30 realizes a function related to the parent IC card 20. For example, the child IC card 30 realizes a function or a part of a function of the parent IC card 20. The child IC card 30 authenticates a user by using biological information different from the biological information used by the parent IC card 20. The child IC card 30 will be described in detail later.

The management server 40 (external device) manages data to be stored in the child IC card 30. For example, the management server 40 stores data to be stored in the parent IC card 20. The management server 40 generates data to be stored in the child IC card 30 based on the data to be stored in the parent IC card 20. For example, the management server 40 generates certificate information composed of a secret key, a public key, etc. as the data to be stored in the child IC card 30. The management server 40 will be described in detail later.

The network 50 relays communication between the issuing device 10 and the management server 40, etc. For example, the network 50 is the Internet or the like. Further, the network 50 may be a local area network (LAN) or the like.

Next, the issuing device 10 will be described.

Figure 2:
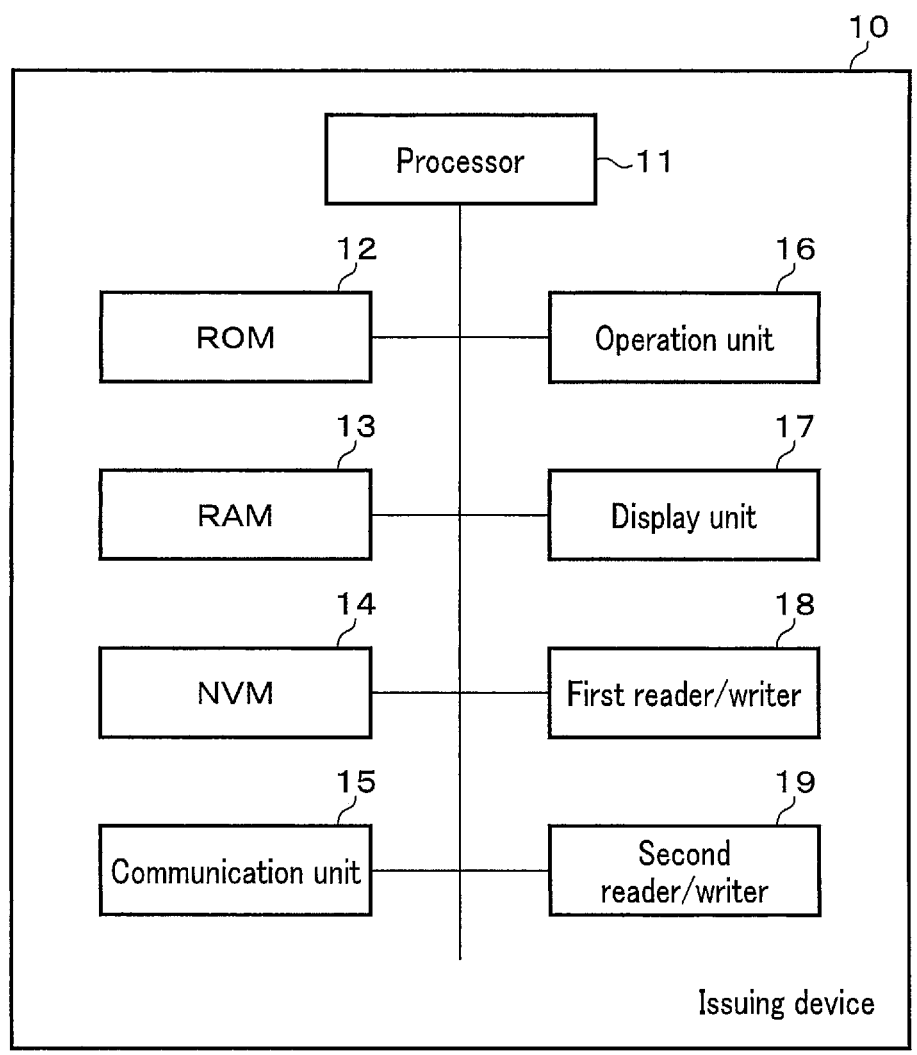
FIG. 2 is a block diagram showing a configuration example of the issuing device according to the first embodiment.

FIG. 2 shows a configuration example of the issuing device 10 according to the embodiment. FIG. 2 is a block diagram showing the configuration example of the issuing device 10. As shown in FIG. 2, the issuing device 10 includes a processor 11, a ROM 12, a RAM 13, an NVM 14, a communication unit 15, an operation unit 16, a display unit 17, a first reader/writer 18, a second reader/writer 19, etc.

The processor 11, ROM 12, RAM 13, NVM 14, communication unit 15, operation unit 16, display unit 17, first reader/writer 18, and second reader/writer 19 are connected to each other via a data bus, etc.

The issuing device 10 may include other configurations as necessary in addition to the configuration shown in FIG. 2, or a specific configuration may be excluded from the issuing device 10.

The processor 11 has a function of controlling the entire operation of the issuing device 10. The processor 11 may include an internal cache, various interfaces, etc. The processor 11 realizes various processes by executing programs stored in advance in an internal memory, the ROM 12, or the NVM 14.

Note that some of the various functions realized by the execution of the programs by the processor 11 may be realized by a hardware circuit. In this case, the processor 11 controls the functions performed by the hardware circuit.

The ROM 12 is a nonvolatile memory in which a control program, control data, etc. are stored in advance. The control program and the control data stored in the ROM 12 are incorporated in advance according to the specifications of the issuing device 10.

The RAM 13 is a volatile memory. The RAM 13 temporarily stores data that is being processed by the processor 11, etc. The RAM 13 stores various application programs based on an instruction from the processor 11. In addition, the RAM 13 may store data necessary for executing the application programs, execution results of the application programs, etc.

The NVM 14 is a data-writable and rewritable nonvolatile memory. The NVM 14 is constituted by, for example, a hard disk drive (HDD), a solid state drive (SSD), a flash memory, or the like. The NVM 14 stores a control program, an application, various kinds of data, etc. in accordance with an operational usage of the issuing device 10.

The communication unit 15 is an interface for communicating with the network 50. That is, the communication unit 15 is an interface for transmitting and receiving data to and from the management server 40, etc. through the network 50. For example, the communication unit 15 is an interface that supports a wired or wireless LAN connection.

The operation unit 16 receives inputs of various operations from an operator. The operation unit 16 transmits signals indicating the input operations to the processor 11. The operation unit 16 may be constituted by a touch panel.

The display unit 17 displays image data from the processor 11. For example, the display unit 17 is constituted by a liquid crystal monitor. In a case where the operation unit 16 is constituted by a touch panel, the display unit 17 may be integrally formed with the operation unit 16.

The first reader/writer 18 is an interface device for transmitting and receiving data to and from the parent IC card 20. The first reader/writer 18 is constituted by an interface corresponding to a communication system of the parent IC card 20. For example, if the parent IC card 20 is a contact-type IC card, the first reader/writer 18 is constituted by a contact portion for physically and electrically connecting to a contact portion of the parent IC card 20, etc. Further, the parent IC card 20 may be a portable electronic device. For example, if the portable electronic device is a device provided with a USB interface, the first reader/writer 18 is constituted by a connection portion for physically and electrically connecting to a USB connector portion of the portable electronic device as the parent IC card 20, etc. That is, the parent IC card 20 may be a USB device instead of an IC card.

If the parent IC card 20 is a non-contact type IC card, the first reader/writer 18 is constituted by an antenna, a communication control unit, etc. for performing wireless communication with the parent IC card 20. The first reader/writer 18 performs power supply, clock supply, reset control, data transmission/reception, etc. for the parent IC card 20.

With such functions, the first reader/writer 18 performs power supply to the parent IC card 20, activation (start) of the parent IC card 20, clock supply, reset control, transmission of various commands, reception of responses to the transmitted commands, etc., based on the control by the processor 11.

The second reader/writer 19 is an interface device for transmitting and receiving data to and from the child IC card 30. The second reader/writer 19 has the same configuration as that of the first reader/writer 18, and a detailed description thereof will be omitted.

Next, the parent IC card 20 will be described.

The parent IC card 20 operates in accordance with a command from the issuing device 10. The parent IC card 20 transmits a response to the command to the issuing device 10. For example, the parent IC card 20 is a My Number card.

FIG. 3 shows a configuration example of the parent IC card 20. As shown in FIG. 3, the parent IC card 20 has a card-like main body Sa formed of plastic or the like. The parent IC card 20 incorporates a module Ma in the main body Sa. The module Ma is integrally formed with an IC chip Ca, a communication unit 25, and an MPU 26 being connected to each other, and is embedded in the main body Sa of the parent IC card 20.

The parent IC card 20 includes the module Ma, etc. The module Ma includes the IC chip Ca, the communication unit 25, the MPU 26, etc. The IC chip Ca includes a processor 21, a ROM 22, a RAM 23, an NVM 24, etc. The processor 21 is connected to the ROM 22, RAM 23, NVM 24, communication unit 25, and MPU 26 via a data bus, etc.

In addition to the configuration shown in FIG. 3, the parent IC card 20 may have other configurations as necessary, or a specific configuration may be excluded from the parent IC card 20.

The processor 21 functions as a control unit that controls the entire parent IC card 20. The processor 21 performs various processing based on the control program and control data stored in the ROM 22 or NVM 24. For example, by executing a program stored in the ROM 22, the processor 21 controls the operation of the parent IC card 20 or performs various processing according to the operation mode of the parent IC card 20.

For example, the processor 21 may be a processor that realizes control of each unit in the parent IC card 20 and information processing by executing a program.

Some of the various functions realized by the processor 21 executing a program may be realized by a hardware circuit. In this case, the processor 21 controls the functions executed by the hardware circuit.

The ROM 22 is a nonvolatile memory storing a control program, control data, etc. in advance. The ROM 22 is incorporated into the parent IC card 20 in a state of storing the control program, the control data, etc. at a manufacturing stage. That is, the control program and the control data stored in the ROM 22 are incorporated in advance in accordance with the specifications of the parent IC card 20, etc.

The RAM 23 is a volatile memory. The RAM 23 temporarily stores data that is being processed by the processor 21, etc. For example, the RAM 23 functions as a calculation buffer, a reception buffer, and a transmission buffer. The calculation buffer temporarily holds results of various calculation processing executed by the processor 21, etc. The reception buffer holds command data, etc. received from the first reader/writer 18 via the communication unit 25. The transmission buffer holds a message (response data), etc. to be transmitted to the first reader/writer 18 via the communication unit 25.

The NVM 24 is constituted by a data-writable and rewritable nonvolatile memory such as a flash ROM. The NVM 24 stores control programs, applications, and various types of data in accordance with the operational usage of the parent IC card 20. For example, program files, data files, etc. are created in the NVM 24. Each of the created files is written with the control programs and various data.

The NVM 24 stores a first secret key, a second secret key, first certificate information composed of a first public key, etc., and second certificate information composed of a second public key, etc. The first secret key, the second secret key, the first certificate information, and the second certificate information will be described later.

The communication unit 25 is an interface for transmitting and receiving data to and from the first reader/writer 18. That is, the communication unit 25 is an interface for transmitting and receiving data to and from the issuing device 10 through the first reader/writer 18.

If the parent IC card 20 is realized as a contact-type IC card, the communication unit 25 is constituted by a communication control unit and a contact unit for physically and electrically contacting the first reader/writer 18 to transmit and receive signals. For example, the parent IC card 20 is activated by receiving a supply of an operation power and an operation clock from the first reader/writer 18 via the contact unit.

If the parent IC card 20 is realized as a non-contact type IC card, the communication unit 25 is constituted by a communication control unit such as a modulation/demodulation circuit for performing wireless communication with the first reader/writer 18, and an antenna. For example, the parent IC card 20 receives radio waves from the first reader/writer 18 via the antenna, modulation/demodulation circuit, etc. The parent IC card 20 generates an operation power and an operation clock from the radio waves by a power source unit (not shown) and is activated.

An MPU 26 (Micro Processing Unit) performs password verification for outputting the first certificate information or the second certificate information.

The MPU 26 registers a template in advance. For example, the template is a face image. Further, the template may be composed of a feature amount extracted from a face image. The MPU 26 performs control to output a template to an external device, etc. That is, if biometric authentication is performed by the parent IC card 20, it is necessary to output biological information such as a face image to an external device.

The first certificate information is output by password verification of a predetermined number of digits (e.g., six digits), and is used for predetermined processing. For example, the first certificate information is an electronic certificate for a signature. For example, the first certificate information is used for an electronic application, online transaction registration, or the like.

The second certificate information is a certificate having a security level lower than that of the first certificate information. The second certificate information is output by password verification with a smaller number of digits (e.g., four digits) than the first certificate information, and is used for predetermined processing. For example, the second certificate information is an electronic certificate for user certification. For example, the second certificate information is used for login to an administrative site (such as a portal site) or a private site (such as online banking).

As a case where the security level of the second certificate information is lower than that of the first certificate information, the number of digits of a key length necessary for authentication of the second certificate information may be smaller than that of a key length necessary for authentication of the first certificate information.

Next, the child IC card 30 will be described.

The child IC card 30 operates in accordance with a command from the issuing device 10. The child IC card 30 transmits a response to a command to the issuing device 10.

Figure 4:
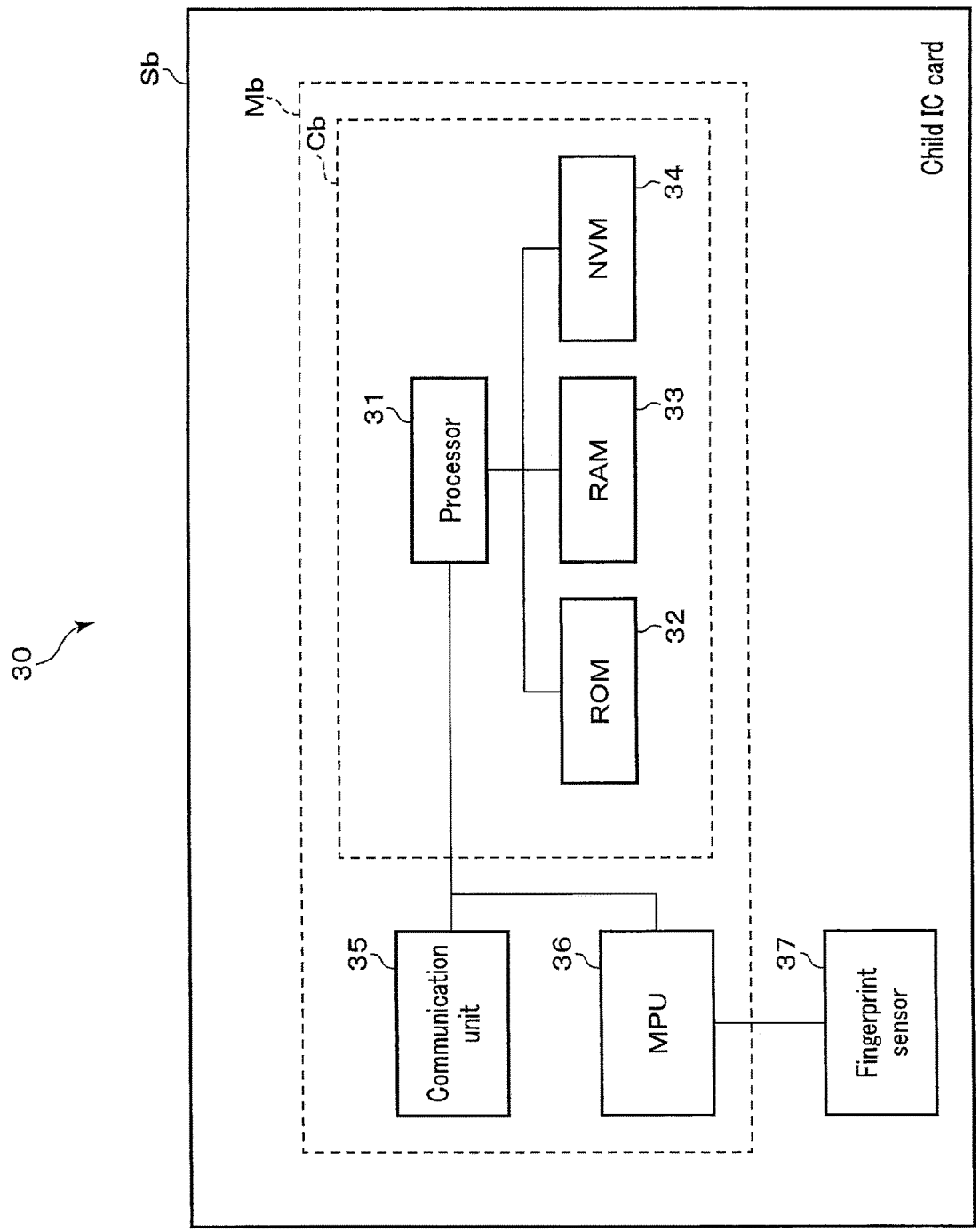
FIG. 4 is a block diagram showing a configuration example of a child IC card according to the first embodiment.

FIG. 4 shows a configuration example of the child IC card 30. As shown in FIG. 4, the child IC card 30 has a card-like main body Sb formed of plastic or the like. The child IC card 30 incorporates a module Mb and a fingerprint sensor 37 in the main body Sb. The module Mb is integrally formed in a state where an IC chip Cb, a communication unit 35, and an MPU 36 are connected, and is embedded in the main body Sb of the child IC card 30.

The child IC card 30 includes the module Mb, the fingerprint sensor 37, etc. The module Mb includes the IC chip Cb, the communication unit 35, the MPU 36, etc. The IC chip Cb includes a processor 31, a ROM 32, a RAM 33, an NVM 34 (a first storage unit and a second storage unit), etc. The processor 31 is connected to the ROM 32, RAM 33, NVM 34, communication unit 35, and MPU 36 via a data bus, etc. The MPU 36 is connected to the fingerprint sensor 37 via a data bus or the like. The first storage unit and the second storage unit may be implemented in physically the same hardware, for example, in one secure NVM 34, or may be implemented in two physically different secure NVM 34, respectively. Further, it may be implemented by another piece of hardware such as a secure element.

The child IC card 30 may include other configurations as necessary in addition to the configuration as shown in FIG. 4, or a specific configuration may be excluded from the child IC card 30.

Since the processor 31, ROM 32, RAM 33, and NVM 34 are the same as the processor 21, ROM 22, RAM 23, and NVM 24, respectively, descriptions thereof will be omitted.

The communication unit 35 is an interface for transmitting and receiving data to and from the second reader/writer 19. That is, the communication unit 35 is an interface for transmitting and receiving data to and from the issuing device 10 through the second reader/writer 19.

Since the communication unit 35 has the same configuration as that of the communication unit 25, a detailed description thereof will be omitted.

The fingerprint sensor 37 acquires a fingerprint image (biological information) from the user's finger. The fingerprint sensor 37 acquires a fingerprint image for generating a template and authenticating the user. For example, the fingerprint sensor 37 includes a CCD sensor or the like. Further, the fingerprint sensor 37 may include a sensor for detecting a change in electric capacitance, etc. The fingerprint sensor 37 transmits the fingerprint image to the MPU 36.

The MPU 36 processes the fingerprint image from the fingerprint sensor 37. The MPU 36 generates a template based on the fingerprint image. For example, the template is a fingerprint image. Further, the template may be composed of a feature amount extracted from a fingerprint image. The processor 31 stores the generated template in the NVM 34.

The MPU 36 also performs verification processing between a fingerprint image from the fingerprint sensor 37 and a template. The MPU 36 calculates a degree of similarity between the fingerprint image from the fingerprint sensor 37 and the template in accordance with a predetermined algorithm. The MPU 36 determines whether or not the verification between the fingerprint image and the template is successful based on the calculated degree of similarity. For example, the MPU 36 determines that the verification is successful if the calculated degree of similarity exceeds a predetermined threshold value. The child IC card 30 can perform biometric authentication without outputting biological information such as a fingerprint image to the outside of the child IC card 30.

The MPU 36 transmits a success or failure in verification to the processor 31.

The processor 31 may be implemented in a form including the function of the MPU 36. Similarly, the MPU 36 may be implemented in a form including the function of the processor 31.

Next, the management server 40 will be described.

Figure 5:
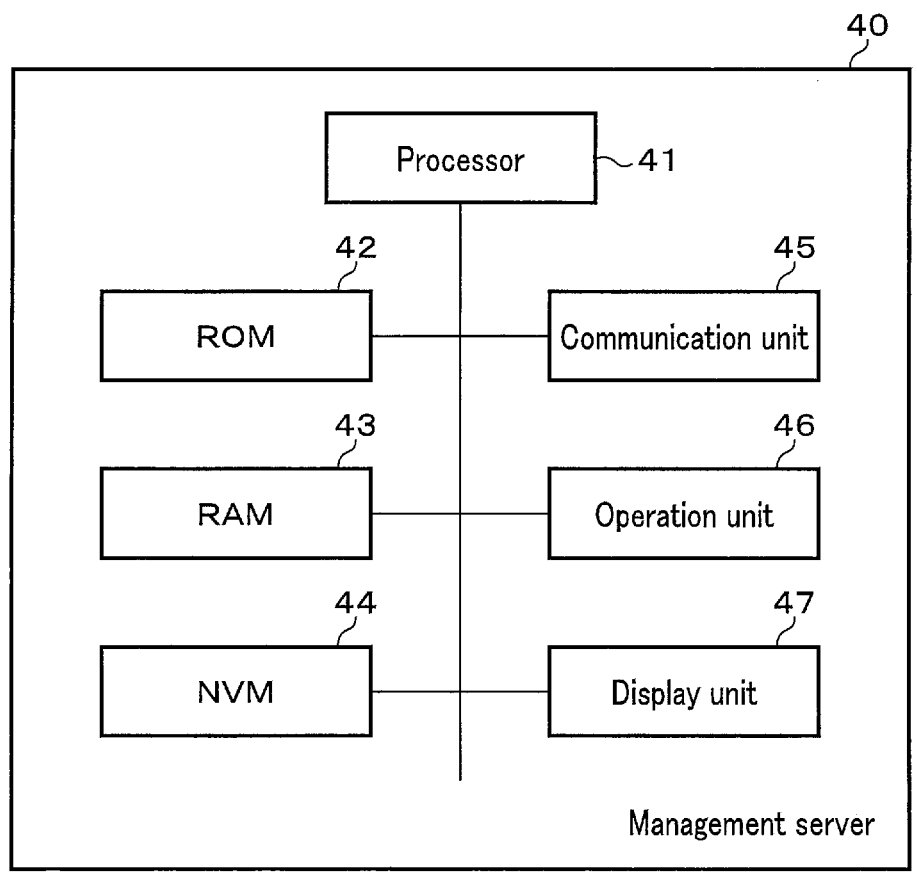
FIG. 5 is a block diagram showing a configuration example of a management server according to the first embodiment.

FIG. 5 shows a configuration example of the management server 40 according to the embodiment. FIG. 5 is a block diagram showing the configuration example of the management server 40. As shown in FIG. 5, the management server 40 includes a processor 41, a ROM 42, a RAM 43, an NVM 44, a communication unit 45, an operation unit 46, a display unit 47, etc.

The processor 41, ROM 42, RAM 43, NVM 44, communication unit 45, operation unit 46, and display unit 47 are connected to each other via a data bus, etc.

The management server 40 may include other configurations as necessary in addition to the configuration as shown in FIG. 5, or a specific configuration may be excluded from the management server 40.

The processor 41 has a function of controlling the entire operation of the management server 40. The processor 41 may include an internal cache, various interfaces, etc. The processor 41 realizes various processing by executing programs stored in advance in the internal memory, ROM 42, or NVM 44.

Note that some of the various functions realized by the execution of the programs by the processor 41 may be realized by a hardware circuit. In this case, the processor 41 controls the functions executed by the hardware circuit.

The ROM 42 is a nonvolatile memory in which a control program, control data, etc. are stored in advance. The control program and the control data stored in the ROM 42 are incorporated in advance according to the specifications of the management server 40.

The RAM 43 is a volatile memory. The RAM 43 temporarily stores data that is being processed by the processor 41, etc. The RAM 43 stores various application programs based on an instruction from the processor 41. In addition, the RAM 43 may store data necessary for executing the application programs, execution results of the application programs, etc.

The NVM 44 is a data-writable and rewritable nonvolatile memory. The NVM 44 is composed of, for example, an HDD, an SSD, or a flash memory. The NVM 44 stores a control program, an application, various kinds of data, etc. according to the operational usage of the management server 40.

The communication unit 45 is an interface for communicating with the network 50. That is, the communication unit 45 is an interface for transmitting and receiving data to and from the issuing device 10 through the network 50. For example, the communication unit 45 is an interface that supports wired or wireless LAN connection.

The operation unit 46 receives inputs of various operations from an operator. The operation unit 46 transmits signals indicating the input operations to the processor 41. The operation unit 46 may be constituted by a touch panel.

The display unit 47 displays image data from the processor 41. For example, the display unit 47 is constituted by a liquid crystal monitor. In the case where the operation unit 46 is constituted by a touch panel, the display unit 47 may be formed integrally with the operation unit 46.

For example, the management server 40 is a desktop PC or the like.

Next, a function realized by the child IC card 30 will be described. The function realized by the child IC card 30 is realized by the processor 31 executing a program stored in the ROM 32, NVM 34, or the like.

First, the processor 31 has a function of registering a template for performing authentication using a fingerprint image.

The processor 31 receives a command (registration command) for instructing registration of a template from the issuing device 10 through the communication unit 35. Upon receiving that registration command, the processor 31 causes the fingerprint sensor 37 to acquire a fingerprint image. For example, the processor 31 activates the fingerprint sensor 37 through the MPU 36 or the like.

Here, it is assumed that the user places a predetermined finger on the fingerprint sensor 37.

The fingerprint sensor 37 acquires a fingerprint image from the predetermined finger of the user. The fingerprint sensor 37 transmits the acquired fingerprint image to the MPU 36.

The MPU 36 acquires the fingerprint image from the fingerprint sensor 37. Upon acquiring the fingerprint image, the MPU 36 generates a template based on the acquired fingerprint image. For example, the MPU 36 extracts a feature amount from the fingerprint image according to a predetermined algorithm. Upon extracting the feature amount, the MPU 36 generates a template composed of the extracted feature amount. The MPU 36 may use the acquired fingerprint image as a template.

If the MPU 36 generates the template, the processor 31 stores the generated template in the NVM 34.

The MPU 36 may generate a template based on a plurality of fingerprint images. The MPU 36 may also generate a template based on fingerprint images from a plurality of fingers. A method by which the MPU 36 generates the template is not limited to a specific method.

Upon storing the template, the processor 31 transmits a response (registration completion response) indicating that the registration is completed to the issuing device 10 through the communication unit 35.

In addition, the processor 31 has a function of storing in the NVM 34 data (second data) related to data (first data) stored in the parent IC card 20.

Here, the first data is the first secret key and the first certificate information, or the second secret key and the second certificate information. The first certificate information is generated from a first public key paired with the first secret key. Similarly, the second certificate information is generated from a second public key paired with the second secret key.

The second data will be described in detail later.

The processor 31 receives a storage command for instructing to store the second data from the issuing device 10 through the communication unit 35. Here, the storage command includes the second data.

Upon receiving the storage command, the processor 31 stores the second data in the NVM 34 in accordance with the storage command. Upon storing the second data, the processor 31 transmits a response (storage completion response) indicating that the storage is completed to the issuing device 10 through the communication unit 35.

The processor 31 may receive a plurality of storage commands. Each of the storage commands includes divided second data. The processor 31 stores the second data in the NVM 34 in accordance with each storage command.

The processor 31 has a function of transmitting the second data to the host device.

The processor 31 authenticates the user using the template in accordance with a command from the host device. The processor 31 causes the fingerprint sensor 37 to acquire a fingerprint image. The processor 31 causes the MPU 36 to verify the acquired fingerprint image with the template. The processor 31 acquires a verification result from the MPU 36. The processor 31 authenticates the user based on the verification result. If the verification is successful, the processor 31 determines that the authentication of the user is successful. If the verification fails, the processor 31 determines that the authentication of the user has failed.

Upon succeeding in authentication of the user, the processor 31 transmits at least some of the second data to the host device through the communication unit 35 in accordance with a command from the host device. For example, the processor 31 transmits a response including the first certificate information or the second certificate information to the host device through the communication unit 35. In addition, the processor 31 can also transmit at least some of the second data, for example, a random number encrypted using the first secret key or the second secret key, to the host device.

The processor 31 also has a function of deleting a template.

The processor 31 receives a deletion command for instructing to delete a template from the issuing device 10 through the communication unit 35.

Upon receiving the deletion command, the processor 31 deletes the template from the MPU 36. Upon deleting the template, the processor 31 transmits a response (deletion completion response) indicating that the deletion is completed to the issuing device 10 through the communication unit 35.

Next, functions realized by the issuing device 10 will be described. The functions realized by the issuing device 10 are realized by the processor 11 executing programs stored in the ROM 12, NVM 14, or the like.

First, the processor 11 has a function of registering a template in the child IC card 30.

Here, it is assumed that the processor 11 is connected to the parent IC card 20 through the first reader/writer 18. It is also assumed that the processor 11 is connected to the child IC card 30 through the second reader/writer 19.

Upon confirming the connection with the parent IC card 20 and the connection with the child IC card 30, the processor 11 transmits a registration command to the child IC card 30 through the second reader/writer 19.

Upon completing the registration by the child IC card 30, the processor 11 receives a registration completion response from the child IC card 30 through the second reader/writer 19.

The processor 11 also has a function of determining authenticity of the parent IC card 20.

Here, the processor 11 authenticates a user carrying the parent IC card 20.

The processor 11 receives an input of a password through the operation unit 16. Here, it is assumed that the user inputs a password to the operation unit.

Upon receiving the input of the password, the processor 11 transmits an authentication request for authenticating the user to the management server 40 through the communication unit 15. The authentication request includes an ID (e.g., My Number) of the parent IC card 20 and the input password.

The processor 11 receives a response indicating an authentication result from the management server 40 through the communication unit 15. If the response indicates that the authentication is successful, the processor 11 determines that the parent IC card 20 is authentic. If the response indicates that the authentication has failed, the processor 11 determines that the parent IC card 20 is not authentic.

The processor 11 also has a function of storing the second data in the child IC card 30.

If it is determined that the parent IC card 20 is authentic, the processor 11 transmits a request (data request) for requesting the second data to the management server 40 through the communication unit 15.

Upon transmitting the data request, the processor 11 receives a response (data response) including the second data from the management server 40 through the communication unit 15. Upon receiving the data response, the processor 11 transmits a storage command for instructing to store the second data included in the data response to the child IC card 30 through the second reader/writer 19.

Further, if it is determined that the parent IC card 20 is authentic, the processor 11 may acquire the second data from the parent IC card 20 and transmit to the child IC card 30 a storage command for instructing the child IC card 30 to store the second data.

Upon completing the storage by the child IC card 30, the processor 11 receives a storage completion response from the child IC card 30 through the second reader/writer 19.

The processor 11 also has a function of deleting a template from the child IC card 30.

If it is determined that the parent IC card 20 is not authentic, the processor 11 transmits a deletion command to the child IC card 30 through the second reader/writer 19.

Upon completing the deletion by the child IC card 30, the processor 11 receives a deletion completion response from the child IC card 30 through the second reader/writer 19.

Next, functions realized by the management server 40 will be described. The functions realized by the management server 40 are realized by the processor 41 executing programs stored in the ROM 42, the NVM 44, or the like.

First, the processor 41 has a function of authenticating the user of the parent IC card 20.

Here, it is assumed that the NVM 44 stores the ID and the password of the parent IC card 20 in association with each other in advance.

The processor 41 receives an authentication request from the issuing device 10 through the communication unit 45. Upon receiving the authentication request, the processor 41 refers to the NVM 44 and verifies a password stored in the authentication request with the password stored in advance.

If the two match, the processor 41 transmits a response indicating that the authentication is successful to the issuing device 10 through the communication unit 45.

If the two do not match, the processor 41 transmits a response indicating that the authentication has failed to the issuing device 10 through the communication unit 45.

The processor 41 also has a function of transmitting the second data to the issuing device 10.

The processor 41 receives the data request from the issuing device 10 through the communication unit 45. Upon receiving the data request, the processor 41 acquires the second data.

As described above, the second data is related to the first data. That is, the second data is associated with the first secret key, the second secret key, the first certificate information, and the second certificate information. Further, it is assumed that the NVM 44 stores the first data in advance.

Here, similarly to the first data, the second data is composed of a first secret key, a second secret key, first certificate information, and second certificate information.

Upon acquiring the second data, the processor 41 transmits a data response including the second data to the issuing device 10 through the communication unit 45.

Next, an operation example of the issuing system 1 will be described.

Figure 6:
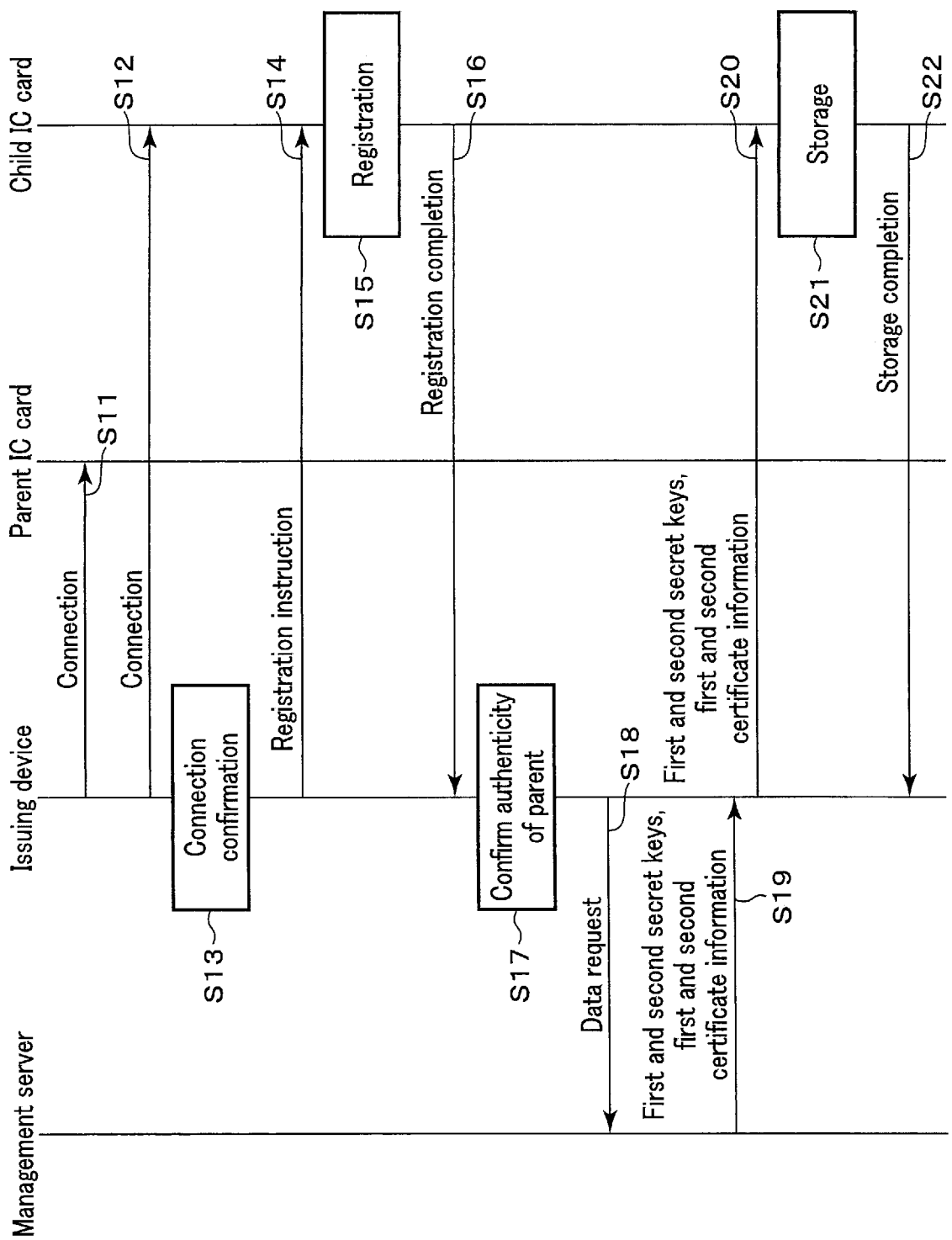
FIG. 6 is a sequence diagram showing an operation example of the issuing system according to the first embodiment.

FIG. 6 is a sequence diagram for explaining an operation example of the issuing system 1.

Here, it is assumed that the parent IC card 20 is set in the first reader/writer 18. It is also assumed that the child IC card 30 is set in the second reader/writer 19.

First, the processor 11 of the issuing device 10 establishes communication with the parent IC card 20 through the first reader/writer 18 (S11). Upon establishing the communication with the parent IC card 20, the processor 11 establishes communication with the child IC card 30 through the second reader/writer 19 (S12).

Upon confirming the communication with the parent IC card 20 and the child IC card 30 (S13), the processor 11 transmits a registration command to the child IC card 30 through the second reader/writer 19 (S14).

The processor 31 of the child IC card 30 receives the registration command through the communication unit 35. Upon receiving the registration command, the processor 31 registers a template of a fingerprint (S15). Upon registering the fingerprint template, the processor 31 transmits a registration completion response to the issuing device 10 through the communication unit 35 (S16).

The processor 11 of the issuing device 10 receives the registration completion response from the child IC card 30 through the second reader/writer 19. Upon receiving the registration completion response, the processor 11 determines authenticity of the parent IC card 20 (S17). As an authentication method of the parent IC card 20, for example, a random number encrypted by using the first secret key stored in the parent IC card 20 and a random number before encryption are transmitted to the management server, and it is confirmed that a result of decrypting a random number encrypted by a first public key corresponding to the first secret key in the management server matches the transmitted random number, thereby determining that a correct secret key is stored, that is, that the parent IC card 20 is authentic. Here, it is assumed that the processor 11 determines that the parent IC card 20 is authentic.

If it is determined that the parent IC card 20 is authentic, the processor 11 transmits a data request to the management server 40 through the communication unit 15 (S18).

The processor 41 of the management server 40 receives the data request through the communication unit 45. Upon receiving the data request, the processor 41 transmits a data response including the first secret key, the second secret key, the first certificate information, and the second certificate information, as the second data, to the issuing device 10 (S19).

The processor 11 of the issuing device 10 receives the data response through the communication unit 15. Upon receiving the data response, the processor 11 transmits, to the child IC card 30 through the second reader/writer 19, a storage command for instructing to store the first secret key, the second secret key, the first certificate information, and the second certificate information, as the second data (S20).

The processor 31 of the child IC card 30 receives the storage command from the issuing device 10 through the communication unit 35. Upon receiving the storage command, the processor 31 stores the second data in the NVM 34 in accordance with the storage command (S21).

Upon storing the second data, the processor 31 transmits a storage completion response to the issuing device 10 through the communication unit 35 (S22).

The processor 11 of the issuing device 10 receives the storage completion response through the second reader/writer 19. Upon receiving the storage completion response by the processor 11, the issuing system 1 ends the operation.

Next, an operation example of the issuing system 1 in a case where the parent IC card 20 is not authentic will be described.

Figure 7:
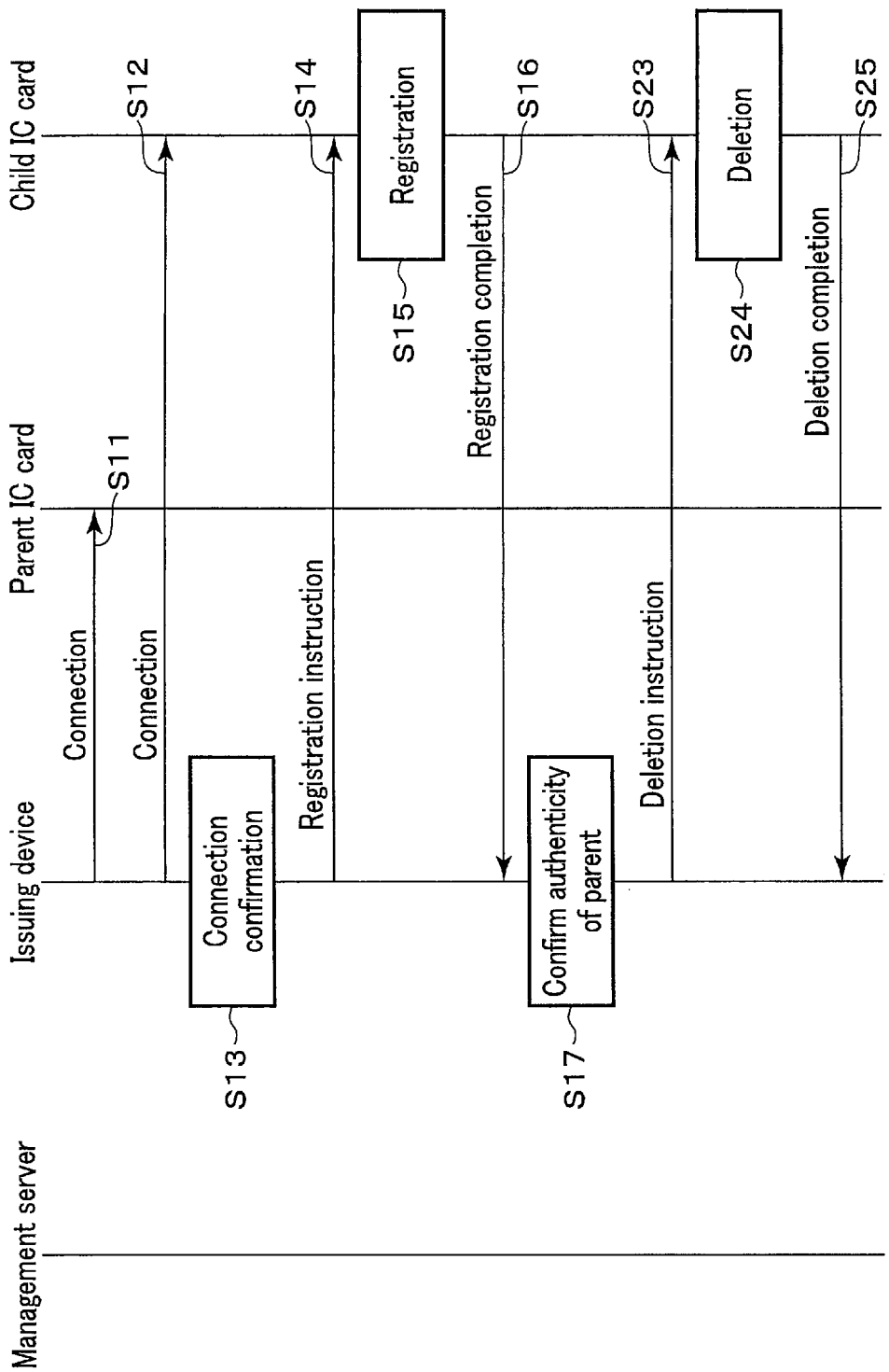
FIG. 7 is a sequence diagram showing an operation example of the issuing system according to the first embodiment.

FIG. 7 is a sequence diagram for explaining an operation example of the issuing system 1 in a case where the parent IC card 20 is not authentic.

S11 to S17 are as described above, and thus descriptions thereof will be omitted.

Here, it is assumed that the processor 11 of the issuing device 10 determines that the parent IC card 20 is not authentic.

If it is determined that the parent IC card 20 is not authentic, the processor 11 transmits a deletion command to the child IC card 30 through the second reader/writer 19 (S23).

The processor 31 of the child IC card 30 receives the deletion command from the issuing device 10 through the communication unit 35. Upon receiving the deletion command, the processor 31 deletes the template in accordance with the deletion command (S24).

Upon deleting the template, the processor 31 transmits a deletion completion response to the issuing device 10 through the communication unit 35 (S25).

The processor 11 of the issuing device 10 receives the deletion completion response through the second reader/writer 19. Upon receiving the deletion completion response by the processor 11, the issuing system 1 ends the operation.

Even in a case other than the case where the parent IC card 20 is not authentic, the processor 11 of the issuing device 10 may transmit the deletion command to the child IC card 30 if the issuance of the child IC card 30 fails. For example, in a case of failing to store the second data in the child IC card 30, the processor 11 may transmit a deletion command to the child IC card 30. In addition, in a case where the acquisition of the second data from the management server 40 fails, the processor 11 may transmit a deletion command to the child IC card 30.

Further, the issuing system 1 may issue a portable electronic device associated with the parent IC card 20. For example, the portable electronic device may be a device that supports a USB connection or the like.

The issuing system having the above-described configuration registers a template based on biological information in the child IC card. The issuing system stores data related to data stored in the parent IC card in the child IC card. As a result, the issuing system can issue the child IC card without using the template of the biological information stored in the parent IC card.

Second Embodiment

Next, a second embodiment will be described.

An issuing system 1 according to the second embodiment is different from that according to the first embodiment in that a child ID, etc. are stored as second data in the child IC card 30. Accordingly, the other points are denoted by the same reference signs, and detailed descriptions thereof will be omitted.

Since the configuration of the issuing system 1 is the same as that according to the first embodiment, a description thereof will be omitted.

Next, a function realized by the management server 40 will be described. The function realized by the management server 40 is realized by the processor 41 executing a program stored in the ROM 42, the NVM 44, or the like.

The processor 41 has a function of transmitting a child ID, etc. as second data to the issuing device 10.

The processor 41 issues a child ID associated with first data. For example, the processor 41 issues the child ID based on the first certificate information or the second certificate information. For example, the child ID is a My Key ID.

Further, the processor 41 issues a password corresponding to the child ID. For example, the password is used to authenticate the user when the child ID is used.

The processor 41 receives the data request from the issuing device 10 through the communication unit 45. Upon receiving the data request, the processor 41 transmits, as the second data, a data response including the child ID, the password, the first certificate information, and the second certificate information to the issuing device 10.

Next, an operation example of the issuing system 1 will be described.

Figure 8:
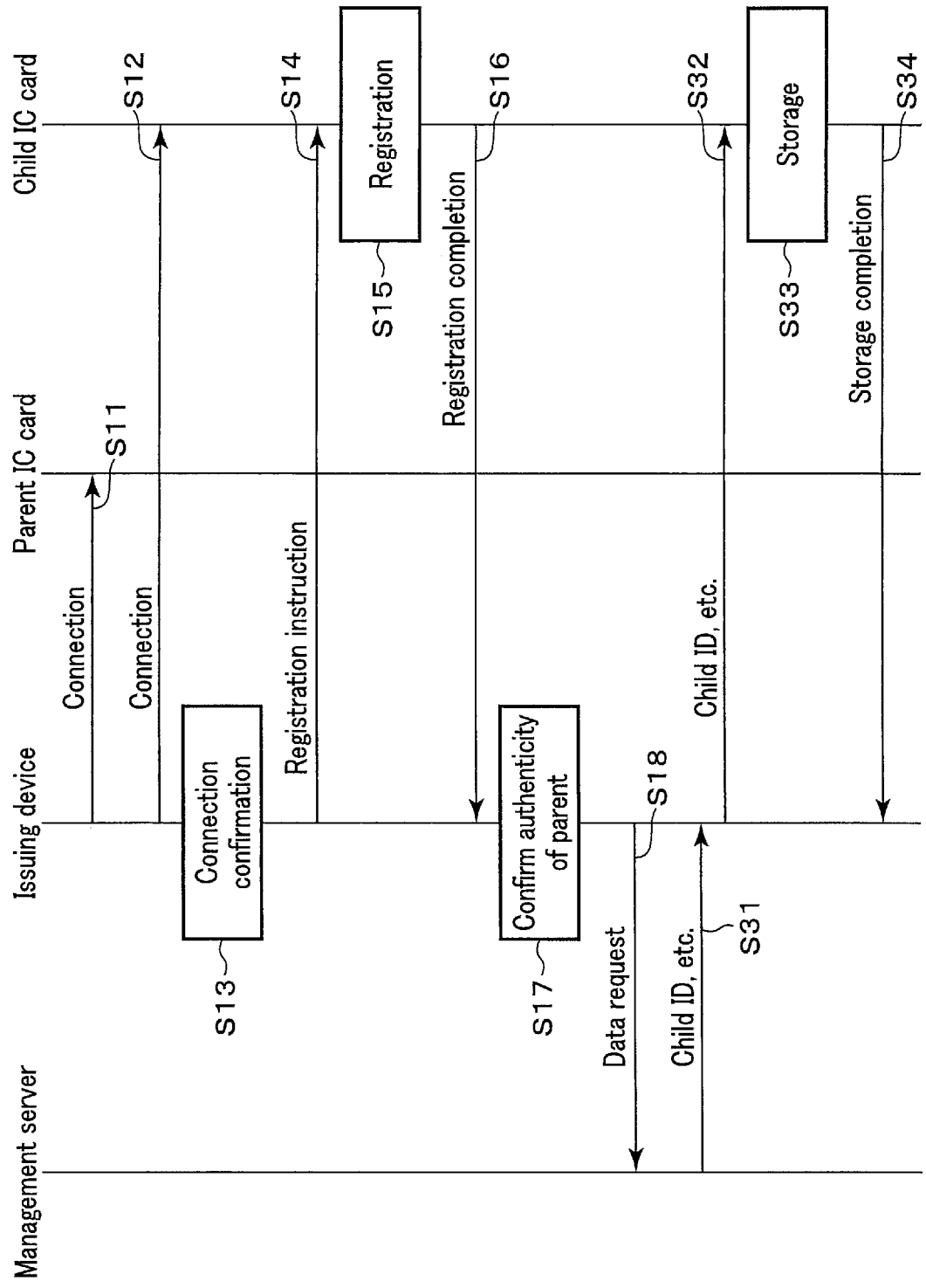
FIG. 8 is a sequence diagram showing an operation example of an issuing system according to a second embodiment.

FIG. 8 is a sequence diagram for explaining an operation example of the issuing system 1.

Here, it is assumed that the parent IC card 20 is authentic.

S11 to S18 are as described above, and thus descriptions thereof will be omitted.

The processor 41 of the management server 40 receives the data request through the communication unit 45. Upon receiving the data request, the processor 41 transmits, as the second data, a data response including the child ID, the password, the first secret key, the second secret key, the first certificate information, and the second certificate information to the issuing device 10 (S31).

The processor 11 of the issuing device 10 receives the data response through the communication unit 15. Upon receiving the data response, the processor 11 transmits a storage command for instructing to store, as the second data, the child ID, the password, the first secret key, the second secret key, the first certificate information, and the second certificate information to the child IC card 30 through the second reader/writer 19 (S32).

The processor 31 of the child IC card 30 receives the storage command from the issuing device 10 through the communication unit 35. Upon receiving the storage command, the processor 31 stores the second data in the NVM 34 in accordance with the storage command (S33).

Upon storing the second data, the processor 31 transmits a storage completion response to the issuing device 10 through the communication unit 35 (S34).

The processor 11 of the issuing device 10 receives the storage completion response through the second reader/writer 19. If the processor 11 receives the storage completion response, the issuing system 1 ends the operation.

As another issuing method, the issuing device 10 may generate second data from first data acquired from the parent IC card 20 and store the second data in the child IC card 30.

The issuing system having the above-described configuration can store the child ID in the child IC card. As a result, the child IC card can be used by an ID different from that of the parent IC card.

Third Embodiment

Next, a third embodiment will be described.

An issuing system 1 according to the third embodiment is different from that according to the first embodiment in that certificate information having a low security level is stored as second data in the child IC card 30. Accordingly, the other points are denoted by the same reference signs, and detailed descriptions thereof will be omitted.

Since the configuration of the issuing system 1 is the same as that according to the first embodiment, a description thereof will be omitted.

Next, a function realized by the management server 40 will be described. The function realized by the management server 40 is realized by the processor 41 executing a program stored in the ROM 42, the NVM 44, or the like.

The processor 11 has a function of transmitting certificate information having a low security level and a secret key corresponding to that certificate information as second data to the issuing device 10.

Upon receiving the data request from the issuing device 10, the processor 11 selects certificate information having a low security level from the first certificate information and the second certificate information. As described above, the security level of the second certificate information is lower than that of the first certificate information.

Therefore, the processor 11 selects the second certificate information as the certificate information having a low security level.

Upon selecting the certificate information with a low security level, the processor 11 transmits a data response including the selected certificate information and a secret key (here, the second secret key) corresponding to the selected certificate information to the issuing device 10 through the communication unit 15.

Next, an operation example of the issuing system 1 will be described.

FIG. 9 is a sequence diagram for explaining an operation example of the issuing system 1.

Here, it is assumed that the parent IC card 20 is authentic. S11 to S18 are as described above, and thus descriptions thereof will be omitted.

The processor 41 of the management server 40 receives the data request through the communication unit 45. Upon receiving the data request, the processor 41 transmits, as the second data, a data response including certificate information having a low security level (here, second certificate information) and a secret key corresponding to that certificate information (here, second secret key) to the issuing device 10 (S41).

The processor 11 of the issuing device 10 receives the data response through the communication unit 15. Upon receiving the data response, the processor 11 transmits, to the child IC card 30 through the second reader/writer 19, a storage command for instructing to store the certificate information having a low security level and the second secret key, as the second data (S42).

The processor 31 of the child IC card 30 receives the storage command from the issuing device 10 through the communication unit 35. Upon receiving the storage command, the processor 31 stores the second data in the NVM 34 in accordance with the storage command (S43).

Upon storing the second data, the processor 31 transmits a storage completion response to the issuing device 10 through the communication unit 35 (S44).

The processor 11 of the issuing device 10 receives the storage completion response through the second reader/writer 19. Upon receiving the storage completion response by the processor 11, the issuing system 1 ends the operation.

As another issuing method, the issuing device 10 may store the secret key and the certificate information having a low security level that are acquired from the parent IC card 20 in the child IC card 30.

The issuing system having the above-described configuration stores certificate information having a low security level in the child IC card. As a result, the issuing system can issue the child IC card more safely by limiting the function than the parent IC card.

Fourth Embodiment

Next, a fourth embodiment will be described.

An issuing system 1 according to the fourth embodiment is different from that according to the first embodiment in that third certificate information based on the first certificate information and the second certificate information, etc. is stored as second data in the child IC card 30. Accordingly, the other points are denoted by the same reference signs, and detailed descriptions thereof will be omitted.

Since the configuration of the issuing system 1 is the same as that according to the first embodiment, a description thereof will be omitted.

Next, a function realized by the management server 40 will be described. The function realized by the management server 40 is realized by the processor 41 executing programs stored in the ROM 42, the NVM 44, or the like.

The processor 11 has a function of transmitting the first certificate information, the second certificate information, and the third certificate information as the second data to the issuing device 10.

Upon receiving the data request from the issuing device 10, the processor 11 generates the third certificate information based on the first certificate information and the second certificate information.

FIG. 10 shows a configuration example of the third certificate information.

As shown in FIG. 10, the third certificate information is composed of a first hash value, a second hash value, a third public key, a third electronic signature, etc.

In addition to the configuration shown in FIG. 10, the third certificate information may include other configurations as necessary, or a specific configuration may be excluded from the third certificate information.

The first hash value is a hash value calculated from the first certificate information by a predetermined hash function.

The second hash value is a hash value calculated from the second certificate information by a predetermined hash function.

The third public key is a public key different from the first public key and the second public key. For example, the processor 41 of the management server 40 generates the third public key in accordance with a predetermined algorithm. Further, a third secret key corresponding to the third public key may be stored in the NVM 44 or the like.

The third electronic signature is an electronic signature generated by the third public key. For example, the processor 41 encrypts the first hash value and the second hash value with the third public key to generate the third electronic signature.

Note that the third certificate information is not limited to a specific configuration.

Upon generating the third certificate information, the processor 11 transmits a data response including the first secret key, the first certificate information, the second secret key, the second certificate information, the third secret key, and the third certificate information as the second data to the issuing device 10 through the communication unit 15.

Next, an operation example of the issuing system 1 will be described.

Figure 11:
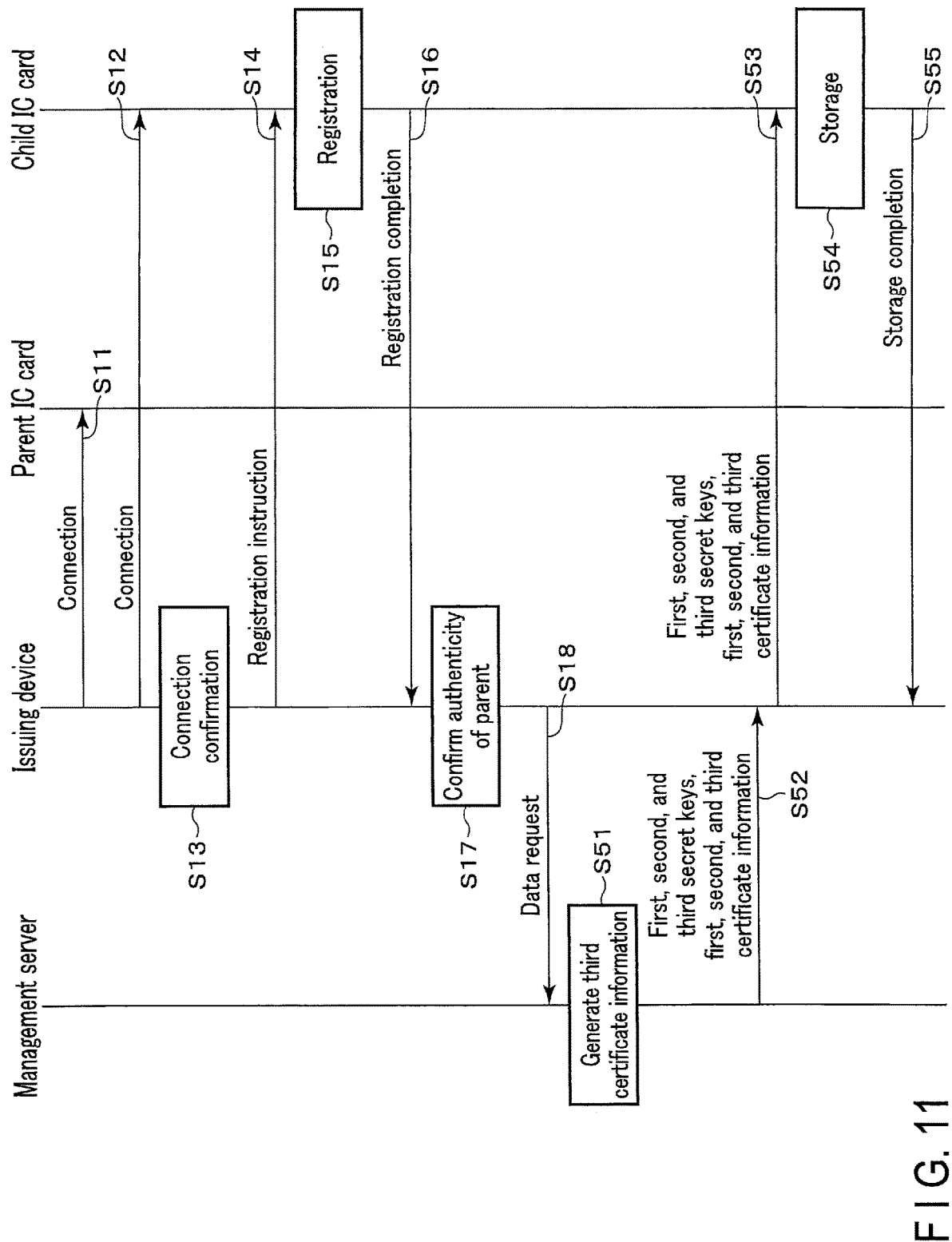
FIG. 11 is a sequence diagram showing an operation example of an issuing system according to a fourth embodiment.

FIG. 11 is a sequence diagram for explaining an operation example of the issuing system 1.

Here, it is assumed that the parent IC card 20 is authentic. S11 to S18 are as described above, and thus descriptions thereof will be omitted.

The processor 41 of the management server 40 receives the data request through the communication unit 45. Upon receiving the data request, the processor 41 generates a third secret key and third certificate information (S51).

Upon generating the third secret key and the third certificate information, the processor 41 transmits a data response including the first secret key, the first certificate information, the second secret key, the second certificate information, the third secret key, and the third certificate information, as the second data, to the issuing device 10 (S52).

The processor 11 of the issuing device 10 receives the data response through the communication unit 15. Upon receiving the data response, the processor 11 transmits, to the child IC card 30 through the second reader/writer 19, a storage command for instructing to store the first secret key, the first certificate information, the second secret key, the second certificate information, the third secret key, and the third certificate information, as the second data (S53).

The processor 31 of the child IC card 30 receives the storage command from the issuing device 10 through the communication unit 35. Upon receiving the storage command, the processor 31 stores the second data in the NVM 34 in accordance with the storage command (S54).

Upon storing the second data, the processor 31 transmits a storage completion response to the issuing device 10 through the communication unit 35 (S55).

The processor 11 of the issuing device 10 receives the storage completion response through the second reader/writer 19. Upon receiving the storage completion response by the processor 11, the issuing system 1 ends the operation.

By storing the third certificate information in the child IC card 30, the following advantages are obtained.

When performing a predetermined process using the child IC card 30, the processor 41 of the management server 40 acquires the first certificate information, the second certificate information, and the third certificate information using the reader/writer.

The processor 41 calculates a hash value from each of the acquired first certificate information and second certificate information. Upon calculating the hash value, the processor 41 confirms that the calculated hash value matches each of a first hash value and a second hash value stored in the third certificate information.

In addition, the processor 41 verifies the third electronic signature by using the third secret key, and verifies that the first hash value and the second hash value stored in the third certificate information are not falsified.

Through the above process, the processor 41 can verify that the first certificate information and the second certificate information are not falsified.

The issuing system having the above-described configuration stores the third certificate information in the child IC card. As a result, the issuing system can make the first certificate information and the second certificate information stored in the child IC card verifiable.

Fifth Embodiment

Next, a fifth embodiment will be described.

An issuing system 1 according to the fifth embodiment is different from that according to the first embodiment in that a fourth secret key and fourth certificate information corresponding to the first secret key and the first certificate information and the second secret key and the second certificate information, etc. are stored, as the second data, in the child IC card 30. Accordingly, the other points are denoted by the same reference signs, and detailed descriptions thereof will be omitted.

Since the configuration of the issuing system 1 is the same as that according to the first embodiment, a description thereof will be omitted.

Next, a function realized by the management server 40 will be described. The function realized by the management server 40 is realized by the processor 41 executing a program stored in the ROM 42, the NVM 44, or the like.

The processor 11 has a function of transmitting a fourth secret key and fourth certificate information corresponding to the first secret key and the first certificate information and the second secret key and the second certificate information, etc., as the second data, to the issuing device 10.

Upon receiving a data request from the issuing device 10, the processor 11 generates a fourth public key and a fourth secret key according to a predetermined algorithm. Upon generating the fourth public key and the fourth secret key, the processor 11 stores the fourth secret key in the NVM 44 in association with the first secret key and the second secret key.

Upon storing the fourth secret key, the processor 11 generates fourth certificate information composed of the fourth public key. Upon generating the fourth certificate information, the processor 11 generates a child ID and a password. The child ID and the password are as described above.

Upon generating the child ID and the password, the processor 11 transmits a data response including the fourth secret key, the fourth certificate information, the child ID, and the password, as the second data, to the issuing device 10 through the communication unit 15.

Next, an operation example of the issuing system 1 will be described.

FIG. 11 is a sequence diagram for explaining an operation example of the issuing system 1.

Here, it is assumed that the parent IC card 20 is authentic.

S11 to S18 are as described above, and thus descriptions thereof will be omitted.

The processor 41 of the management server 40 receives the data request through the communication unit 45. Upon receiving the data request, the processor 41 generates a fourth public key and a fourth secret key (S61).

Upon generating the fourth public key and the fourth secret key, the processor 41 stores the fourth secret key in the NVM 44 in association with the first secret key and the second secret key (S62). Upon storing the fourth secret key, the processor 41 transmits a data response including the fourth secret key, the fourth certificate information, the child ID, and the password, as the second data, to the issuing device 10 (S63).

The processor 11 of the issuing device 10 receives the data response through the communication unit 15. Upon receiving the data response, the processor 11 transmits a storage command for instructing to store the fourth secret key, the fourth certificate information, the child ID, and the password, as the second data, to the child IC card 30 through the second reader/writer 19 (S64).

The processor 31 of the child IC card 30 receives the storage command from the issuing device 10 through the communication unit 35. Upon receiving the storage command, the processor 31 stores the second data in the NVM 34 in accordance with the storage command (S65).

Upon storing the second data, the processor 31 transmits a storage completion response to the issuing device 10 through the communication unit 35 (S66).

The processor 11 of the issuing device 10 receives the storage completion response through the second reader/ writer 19. Upon receiving the storage completion response by the processor 11, the issuing system 1 ends the operation.

The issuing system 1 can generate a 4a-th secret key and 4a-th certificate information corresponding to the first secret key and the first certificate information, and a 4b-th secret key and 4b-th certificate information corresponding to the second secret key and the second certificate information, and store the 4a-th secret key, the 4a-th certificate information, the 4b-th secret key, and the 4b-th certificate information, as the second data, in the child IC card 30. In the following, even in the case of a plurality of secret keys such as the 4a-th secret key and the 4b-th secret key, the secret key is simply referred to as a fourth secret key, and even in the case of a plurality of pieces of certificate information such as the 4a-th certificate information and the 4b-th certificate information, the certificate information is simply referred to as fourth certificate information.

In the issuing system having the above-described configuration, the fourth secret key and the fourth certificate information associated with the certificate information stored in the parent IC card are stored in the child IC card. As a result, even in the case where the fourth secret key or the fourth certificate information stored in the child IC card is leaked, the certificate information stored in the parent IC card is not affected. Thus, even if the child IC card is issued, the security of the parent IC card is less likely to be lowered.

Sixth Embodiment

Next, a sixth embodiment will be described.

An issuing system according to the sixth embodiment is different from that according to the fifth embodiment in that a key server issues a fourth secret key and fourth certificate information. Accordingly, the other points are denoted by the same reference signs, and detailed descriptions thereof will be omitted.

Figure 13:
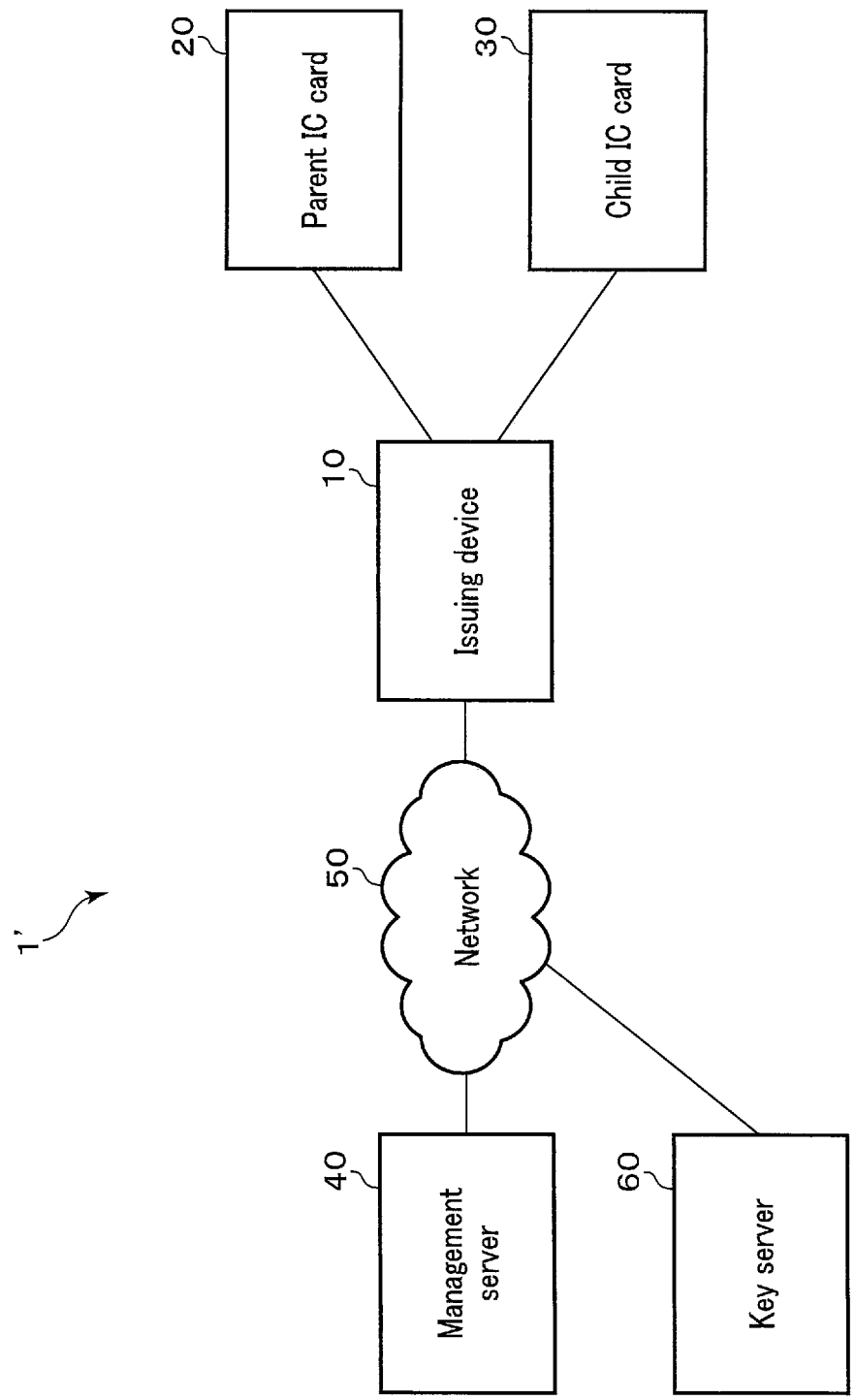
FIG. 13 is a block diagram showing a configuration example of an issuing system according to a sixth embodiment.

FIG. 13 shows a configuration example of an issuing system 1' according to the sixth embodiment. As shown in FIG. 13, the issuing system 1' includes an issuing device 10, a parent IC card 20, a child IC card 30, a management server 40, a key server 60, etc. The key server 60 is connected to the issuing device 10 via a network 50.

The issuing system 1' may further include other configurations as necessary in addition to the configuration as shown in FIG. 13, or a specific configuration may be excluded from the issuing system 1'.

Since the issuing device 10, the parent IC card 20, the child IC card 30, and the management server 40 are the same as those according to the first embodiment, descriptions thereof will be omitted.

The key server 60 (external device) issues a fourth secret key and fourth certificate information corresponding to the first secret key and the first certificate information and the second secret key and the second certificate information.

Figure 14:
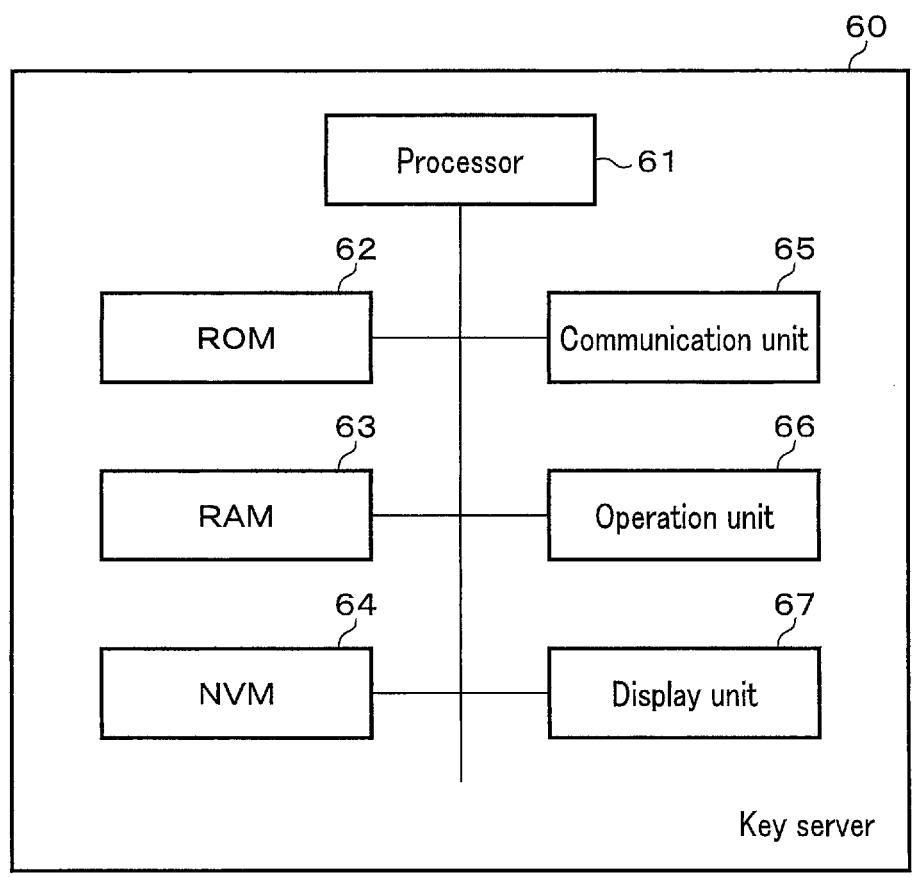
FIG. 14 is a block diagram showing a configuration example of a key server according to the sixth embodiment.

FIG. 14 shows a configuration example of the key server 60. FIG. 14 is a block diagram showing a configuration example of the key server 60. As shown in FIG. 14, the key server 60 includes a processor 61, a ROM 62, a RAM 63, an NVM 64, a communication unit 65, an operation unit 66, a display unit 67, etc.

The processor 61, ROM 62, RAM 63, NVM 64, communication unit 65, operation unit 66, and display unit 67 are connected to each other via a data bus, etc.

The key server 60 may include other configurations as necessary in addition to the configuration as shown in FIG. 14, or a specific configuration may be excluded from the key server 60.

The processor 61 has a function of controlling the entire operation of the key server 60. The processor 61 may include an internal cache, various interfaces, etc. The processor 61 realizes various processes by executing programs stored in advance in an internal memory, the ROM 62, or the NVM 64.

Note that some of the various functions realized by the execution of the programs by the processor 61 may be realized by a hardware circuit. In this case, the processor 61 controls the functions executed by the hardware circuit.

The ROM 62 is a nonvolatile memory in which a control program, control data, etc. are stored in advance. The control program and the control data stored in the ROM 62 are incorporated in advance according to the specifications of the key server 60.

The RAM 63 is a volatile memory. The RAM 63 temporarily stores data that is being processed by the processor 61, etc. The RAM 63 stores various application programs based on an instruction from the processor 61. In addition, the RAM 63 may store data necessary for executing an application program, an execution result of the application program, etc.

The NVM 64 is a data-writable and rewritable nonvolatile memory. The NVM 64 is composed of, for example, an HDD, an SSD, a flash memory, or the like. The NVM 64 stores a control program, an application, various kinds of data, etc. according to an operational usage of the key server 60.

The communication unit 65 is an interface for communicating with the network 50. That is, the communication unit 65 is an interface for connecting to the issuing device 10 or the like through the network 50. For example, the communication unit 65 is an interface that supports wired or wireless LAN connection.

The operation unit 66 receives inputs of various operations from an operator. The operation unit 66 transmits signals indicating the input operations to the processor 61. The operation unit 66 may be constituted by a touch panel.

The display unit 67 displays image data from the processor 61. For example, the display unit 67 is constituted by a liquid crystal monitor. If the operation unit 66 is constituted by a touch panel, the display unit 67 may be formed integrally with the operation unit 66.

For example, the key server 60 is a desktop PC or the like.

Next, functions realized by the issuing device 10 will be described. The functions realized by the issuing device 10 are realized by the processor 11 executing programs stored in the ROM 12, the NVM 14, or the like.

First, the processor 11 has a function of acquiring a child ID and a password from the management server 40.

If it is determined that a parent IC card 20 is authentic, the processor 11 transmits a request (ID request) for requesting the child ID and the password to the management server 40 through the communication unit 15.

The child ID and the password are as described above.

Upon transmitting the ID request, the processor 11 receives a response (ID response) including the child ID and the password from the management server 40 through the communication unit 15.

The processor 11 also has a function of acquiring the fourth secret key and the fourth certificate information from the key server 60.

The processor 11 transmits a request (key request) for requesting the fourth secret key and the fourth certificate information to the management server 40 through the communication unit 15. Here, the key request includes the child ID and the password.

Upon transmitting the key request, the processor 11 receives a response (key response) including the fourth secret key and the fourth certificate information from the management server 40 through the communication unit 15.

The processor 11 also has a function of storing the fourth secret key, the fourth certificate information, the child ID, and the password, as the second data, in the child IC card 30.

The processor 11 transmits a storage command for instructing storage of the fourth secret key, the fourth certificate information, the child ID, and the password to the child IC card 30 through the second reader/writer 19.

Upon completing the storage by the child IC card 30, the processor 11 receives a storage completion response from the child IC card 30 through the second reader/writer 19.

Next, a function realized by the management server 40 will be described. The function realized by the management server 40 is realized by the processor 41 executing a program stored in the ROM 42, the NVM 44, or the like.

The processor 41 has a function of transmitting a child ID and a password to the issuing device 10.

The processor 41 issues a child ID and a password.

The processor 41 receives an ID request from the issuing device 10 through the communication unit 45. Upon receiving the ID request, the processor 41 transmits an ID response including the child ID and the password to the issuing device 10.

Next, a function realized by the key server 60 will be described. The function realized by the key server 60 is realized by the processor 61 executing a program stored in the ROM 62, the NVM 64, or the like.

The processor 61 has a function of transmitting a fourth secret key, fourth certificate information, etc. corresponding to the first secret key, the first certificate information, the second secret key, and the second certificate information to the issuing device 10.

The processor 61 receives a key request from the issuing device 10 through the communication unit 65. Upon receiving the key request, the processor 61 generates a fourth public key and a fourth secret key according to a predetermined algorithm.

Upon generating the fourth public key and the fourth secret key, the processor 61 generates fourth certificate information composed of the fourth public key. Upon generating the fourth certificate information, the processor 61 transmits a key response including the fourth secret key and the fourth certificate information to the issuing device 10 through the communication unit 65.

Upon transmitting the key response, the processor 61 stores the fourth secret key and the fourth certificate information in the NVM 64 in association with a child ID and a password included in the key request.

Next, an operation example of the issuing system 1' will be described.

Figure 15:
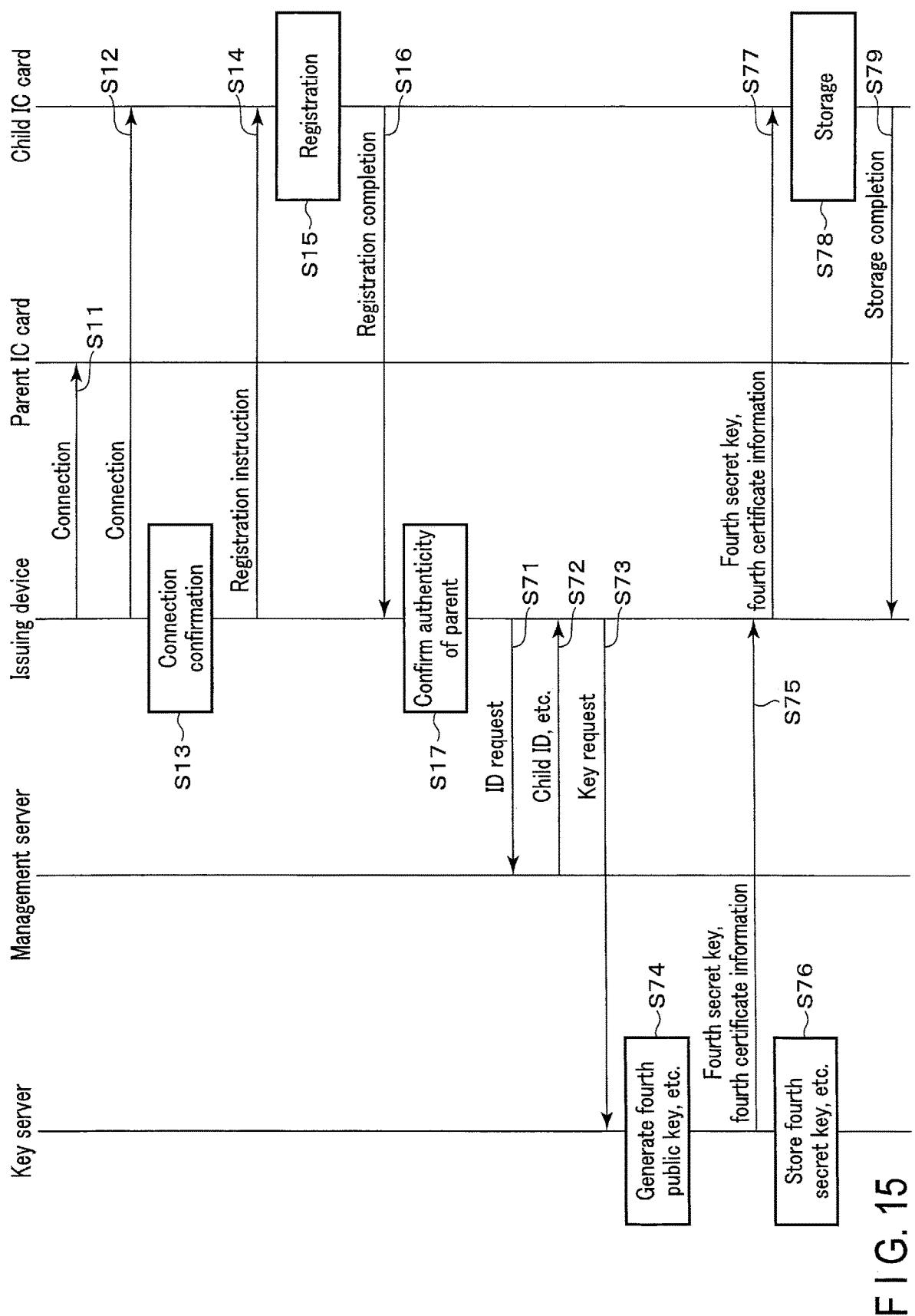
FIG. 15 is a sequence diagram showing an operation example of the issuing system according to the sixth embodiment.

FIG. 15 is a sequence diagram for explaining the operation example of the issuing system 1'.

Here, it is assumed that the parent IC card 20 is authentic.

S11 to S17 are as described above, and thus descriptions thereof will be omitted.

If it is determined that the parent IC card 20 is authentic, the processor 11 transmits an ID request to the management server 40 through the communication unit 15 (S71).

The processor 41 of the management server 40 receives the ID request through the communication unit 45. Upon receiving the data request, the processor 41 transmits an ID response including the child ID and the password to the issuing device 10 (S72).

The processor 11 of the issuing device 10 receives the ID response through the communication unit 15. Upon receiving the ID response, the processor 11 transmits a key request to the key server 60 through the communication unit 15 (S73).

The processor 61 of the key server 60 receives the key request through the communication unit 65. Upon receiving the key request, the processor 61 generates a fourth public key and a fourth secret key (S74).

Upon generating the fourth public key and the fourth secret key, the processor 61 transmits a key response including the fourth secret key and the fourth certificate information to the issuing device 10 (S75). Upon transmitting the key response, the processor 61 stores the fourth secret key and the fourth certificate information in the NVM 64 in association with the child ID and the password included in the key request (S76).

The processor 11 of the issuing device 10 receives the key response through the communication unit 15. Upon receiving the key response, the processor 11 transmits a storage command for instructing to store the fourth secret key, the fourth certificate information, the child ID, and the password, as the second data, to the child IC card 30 through the second reader/writer 19 (S77).

The processor 31 of the child IC card 30 receives the storage command from the issuing device 10 through the communication unit 35. Upon receiving the storage command, the processor 31 stores the second data in the NVM 34 in accordance with the storage command (S78).

Upon storing the second data, the processor 31 transmits a storage completion response to the issuing device 10 through the communication unit 35 (S79).

The processor 11 of the issuing device 10 receives the storage completion response through the second reader/writer 19. Upon receiving the storage completion response by the processor 11, the issuing system 1' ends the operation.

The issuing system having the above-described configuration manages the fourth public key and the fourth secret key by using the key server. As a result, the issuing system can store the fourth certificate information in the child IC card without changing the existing management server.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An integrated circuit (IC) card associated with a parent IC card, the IC card comprising:
   a sensor configured to acquire second biological information different from first biological information stored in the parent IC card;
   a first storage unit configured to store a template with which the second biological information is verified;
   a second storage unit configured to store second data, the second data being instructed to be stored by a storage command from an issuing device that has determined that the parent IC card is authentic and being related to first data stored in the parent IC card;
   a communication circuit configured to transmit and receive data to and from a host device;

a first processor configured to perform verification between the second biological information acquired by the sensor and the template; and a second processor configured to:
authenticate a user based on a verification result of the second biological information and the template in accordance with a command from the host device; and transmit at least some of the second data to the host device if the authentication of the user is successful.

2. The IC card according to claim 1, wherein the first data includes a first secret key and first certificate information composed of a first public key and a second secret key and second certificate information composed of a second public key.

3. The IC card according to claim 2, wherein the second data includes the first secret key, the first certificate information, the second secret key, and the second certificate information.

4. The IC card according to claim 3, wherein the second data further includes a child ID.

5. The IC card according to claim 4, wherein the second data further includes a password corresponding to the child ID.

6. The IC card according to claim 3, wherein the second data further includes third certificate information based on the first certificate information and the second certificate information.

7. The IC card according to claim 6, wherein the third certificate information includes a first hash value generated from the first certificate information and a second hash value generated from the second certificate information.

8. The IC card according to claim 2, wherein the second data includes either one of the first certificate information or the second certificate information, whichever has a lower security level.

9. The IC card according to claim 2, wherein the second data includes a fourth secret key corresponding to the first secret key and the second secret key.

10. The IC card according to claim 1, wherein the second biological information is a fingerprint image.

11. An integrated circuit (IC) card associated with a parent IC card, the IC card comprising:
a module including a sensor configured to acquire second biological information different from first biological information stored in the parent IC card, a first storage unit configured to store a template with which the biological information is verified, a second storage unit configured to store second data, the second data being instructed to be stored by a storage command from an issuing device that has determined that the parent IC card is authentic and being related to first data stored in the parent IC card, a communication circuit configured to transmit and receive data to and from a host device, a first processor configured to perform verification between the second biological information acquired by the sensor and the template, and a second processor configured to authenticate a user based on a verification result of the second biological information and the template in accordance with a command from the host device and to transmit at least some of the second data to the host device if the authentication of the user is successful; and a main body incorporating the module.

12. A portable electronic device associated with a parent integrated circuit (IC) card, the portable electronic device comprising:
a sensor configured to acquire second biological information different from first biological information stored in the parent IC card;

a first storage unit configured to store a template with which the second biological information is verified;

a second storage unit configured to store second data, the second data being instructed to be stored by a storage command from an issuing device that has determined that the parent IC card is authentic and being related to first data stored in the parent IC card;

a communication-nit circuit configured to transmit and receive data to and from a host device;

a first processor configured to perform verification between the second biological information acquired by the sensor and the template; and a second processor configured to:
authenticate a user based on a verification result of the second biological information and the template in accordance with a command from the host device; and transmit at least some of the second data to the host device if the authentication of the user is successful.

* * * * *